(12) United States Patent
Bowen

(10) Patent No.: US 12,534,872 B2
(45) Date of Patent: Jan. 27, 2026

(54) HYDRAULIC DRIVE SYSTEM

(71) Applicant: Western States Equipment Company, Boise, ID (US)

(72) Inventor: Jason Bowen, Rathdrum, ID (US)

(73) Assignee: Western States Equipment Company, Boise, ID (US)

( * ) Notice: Subject to any disclaimer, the term of this patent is extended or adjusted under 35 U.S.C. 154(b) by 0 days.

(21) Appl. No.: 18/630,246

(22) Filed: Apr. 9, 2024

(65) Prior Publication Data

US 2025/0314040 A1 Oct. 9, 2025

(51) Int. Cl.
E02F 9/02 (2006.01)
E02F 9/18 (2006.01)
E02F 9/22 (2006.01)

(52) U.S. Cl.
CPC ............... *E02F 9/022* (2013.01); *E02F 9/02* (2013.01); *E02F 9/18* (2013.01); *E02F 9/22* (2013.01)

(58) Field of Classification Search
CPC ............ B60K 2007/003; B60K 7/0015; F16H 2047/025; B60F 1/043; E02F 9/022
See application file for complete search history.

(56) References Cited

U.S. PATENT DOCUMENTS

| | | | | |
|---|---|---|---|---|
| 2,718,197 A * | 9/1955 | Bock | ................... | B60F 1/043 |
| | | | | 105/101 |
| 5,518,461 A * | 5/1996 | Pfordt | ................... | F16H 47/04 |
| | | | | 475/72 |
| 6,352,035 B1 * | 3/2002 | Kashiwase | ............... | B60F 1/043 |
| | | | | 105/215.1 |
| 7,201,106 B2 * | 4/2007 | Whiston | ................ | B61D 15/00 |
| | | | | 105/72.2 |
| 7,406,619 B2 | 7/2008 | Lynn | | |
| 7,421,952 B2 | 9/2008 | Taylor | | |
| 8,316,774 B1 * | 11/2012 | Coots | ...................... | B61C 11/00 |
| | | | | 180/320 |
| 9,096,107 B2 * | 8/2015 | Bodell | ....................... | B60F 1/04 |
| 9,446,662 B2 * | 9/2016 | Coots | ..................... | B60K 25/06 |
| 9,533,535 B2 * | 1/2017 | Akesson | ................ | E02F 9/022 |
| 9,592,733 B2 | 3/2017 | Lyle et al. | | |
| 9,878,724 B2 * | 1/2018 | Evans | ....................... | B61C 9/14 |
| 9,994,105 B2 | 6/2018 | Roberts | | |

(Continued)

FOREIGN PATENT DOCUMENTS

| | | |
|---|---|---|
| CA | 2565458 | 2/2010 |
| CA | 3022474 | 12/2017 |

(Continued)

*Primary Examiner* — Thomas E Lazo
(74) *Attorney, Agent, or Firm* — Hawley Troxell; Philip McKay

(57) ABSTRACT

An improved hydraulic drive system utilizes a counterbalance units to eliminate hydraulic back pressure from rail wheel drive axel motors when the high rail drive system rail wheels are unpowered and coasting, a dedicated cavitation prevention pump to provide a constant supply of hydraulic fluid to the rail wheel drive axel motors when rail wheels are unpowered and coasting and thereby prevent cavitation, and a limited slip valve compensator that allows hydraulic fluid pressure to be equalized between rail wheel drive axel motors of the high rail drive system to ensure equalized drive forces on the rail wheels and true four wheel drive for the high rail drive system.

32 Claims, 24 Drawing Sheets

(56) References Cited

U.S. PATENT DOCUMENTS

| | | |
|---|---|---|
| 10,385,545 B2 | 8/2019 | Kamoshita et al. |
| 10,407,875 B2 | 9/2019 | Kawaguchi et al. |
| 11,047,112 B2 | 6/2021 | Jimbo et al. |
| 2006/0096131 A1 | 5/2006 | Hall |
| 2009/0282710 A1 | 11/2009 | Johnson |
| 2015/0027340 A1 | 1/2015 | Harman |
| 2015/0224839 A1* | 8/2015 | Krols ................ B61D 15/00 105/72.2 |
| 2017/0261084 A1* | 9/2017 | Lloyd ................ F16H 47/04 |
| 2017/0284063 A1* | 10/2017 | Fukuda .............. E02F 9/2235 |
| 2018/0209524 A1* | 7/2018 | Dodson .............. B60T 10/04 |
| 2019/0017244 A1* | 1/2019 | Malmberg ........... B60K 17/10 |
| 2020/0158235 A1* | 5/2020 | Oasa ................. E02F 9/2267 |

FOREIGN PATENT DOCUMENTS

| | | | | |
|---|---|---|---|---|
| CN | 102490729 A | * | 6/2012 | |
| CN | 106494166 A | * | 3/2017 | ............ B60R 1/043 |
| CN | 220337173 U | * | 1/2024 | |
| DE | 102010042801 A1 | * | 4/2012 | ........ A01D 41/1274 |
| EP | 2312185 A2 | * | 4/2011 | ........... B60W 10/02 |
| WO | WO-9605078 A1 | * | 2/1996 | ............ B60F 1/043 |
| WO | WO 2013/167595 | | 11/2013 | |

\* cited by examiner

HYDRAULIC DRIVE SYSTEM

BACKGROUND

In the United States alone, approximately 1.6 billion tons of freight are transported by rail each year on nearly 140,000 miles of railroad track. To put this number in perspective, without railroads, 83 million more trucks would be needed on American highways alone to meet current freight demands, and at least four times the fuel now used would be required to power these additional trucks.

Clearly a reliable and an efficiently operated rail system is critical to commerce, and the environment, both in the United States and all over the world. One critical component of maintaining a safe and effective rail system is the ability to repair, replace, and maintain the railroad system itself, as well as the surrounding right of way, to ensure safe operation of the railroad system and trains.

To this end, heavy equipment, such as excavators, trucks, bull dozers, etc. must have access to virtually every mile of the railroad tracks, and the associated right of way, to dig the trenching for new or replacement railroad tracks, perform railroad maintenance, clear brush below roadbed level, clean culverts around railroad tracks, and perform numerous other railroad maintenance and repair procedures.

However as noted above, in the United States alone, there is over 140,000 miles of railroad track that traverses virtually every type of terrain. In addition, the vast majority of railroad tracks run through isolated areas often far from cities and towns, and often with very limited access. Thus, ensuring that all kinds of heavy equipment can access every mile of rail, and/or right of way, is a long-standing issue for the railroad system operators.

One solution to this situation is to provide heavy equipment with the ability to travel by rail to a given worksite. In the past, this was accomplished by simply loading the equipment onto a flatbed railroad car and using a train engine to tow the flatbed railroad car to the worksite. However, this is a very inefficient use of flatbed railroad cars, engines, people, and other resources. As an example, using flatbed railroad cars, the equipment, such as an excavator, must be loaded onto the flatbed railroad car. Then a train engine must be obtained and transported to the flatbed railroad car location and the flatbed railroad car must be attached to the engine. The flatbed railroad car must then be pulled to the worksite where the equipment must then be unloaded. Then, while the work is being performed, the train or train engine must either remain at the site or be called back when the job is done. Then when the job is done, the equipment must be reloaded onto the flatbed railroad car, the train/engine must be recalled, and the equipment must be towed back to the storage site, or next worksite, where the equipment must then be unloaded again.

Clearly the flatbed railroad car system is not practical when 140,000 mile of track and right of way is involved. To address this issue, heavy equipment, such as excavators, which have their own hydraulic systems, have historically been modified to include a drive system referred to as a high-rail drive system. As discussed below, prior art high-rail drive systems allow the heavy equipment to travel under its own power using rail wheels that fit on-railroad tracks to get to a worksite. Then once at the worksite, the equipment is moved off of the railroad tracks using its own power and is thus freed to move around the worksite off the railroad tracks on its own drive system, such as cat tracks or wheels and/or tires.

FIGS. 1A, 1B, 1C, 1D, and 1E, show an illustrative example of a unit of heavy equipment, in the specific illustrative example of FIGS. 1A, 1B, 1C, 1D, and 1E an excavator 100, such as those currently used in railroad construction, repair, and maintenance that includes a prior art high-rail drive system is shown.

Hydraulic excavators, such as excavator 100, are very useful tools in the railroad industry. However, as noted, many railroad systems extend far out into remote locations. This makes the use of excavators for railroad maintenance and repair difficult, expensive, and time consuming. However, by mounting railroad equipment, such as excavators, on undercarriages that include prior art high-rail drive systems, many of the transportation and access problems associated with flatbed methods are eliminated. However, as discussed in more detail below, currently available high-rail drive systems unfortunately introduce new issues and problems.

Referring to FIGS. 1A, 1B, 1C, 1D, and 1E, excavator 100 includes rotating platform 101 with operator cab 102, counterweight 103, boom 104, stick 105, and bucket 106. Also included with excavator 100, but not show, are an engine(s), fuel, and hydraulic oil tanks that make excavator 100 independently mobile and self-sufficient.

As seen in FIGS. 1A, 1B, 1C, 1D, and 1E, excavator 100 includes an undercarriage 107 including a prior art high-rail drive system 120. As noted above, prior art high-rail drive systems 120 allow self-propelled heavy equipment, such as, excavator 100, to operate in a cat drive/off-rail mode in which the self-propelled heavy equipment, such as, excavator 100, can travel under its own power on tracks, such as cat tracks 108, or wheels/tires, at a worksite. As also noted above, prior art high-rail drive systems 120 allow self-propelled heavy equipment, such as, excavator 100, to operate in a rail wheel drive/on-rail mode so that self-propelled heavy equipment, such as excavator 100, can propel itself on the railroad tracks of the railroad system to get back and forth to the worksite. To this end, excavator 100, includes rail wheels attached to rail wheel drive axels. FIG. 1E shows high-rail drive system 120 including rail wheels 111 attached to rail wheel drive axels 109 and cat tracks 108.

Typically, all movement and functions of a hydraulic excavator, such as excavator 100, are accomplished through the use of hydraulic fluid via use of hydraulic cylinders and hydraulic motors (not shown). Typically, the rotating platform 101, and all the components of the rotating platform 101, attach to the undercarriage 107 by way of a swivel bearing 110. Typically, high pressure hydraulic fluid is supplied to the cat tracks 108 or rail wheels 111 using one or more hydraulic motors, not shown.

Herein, hydraulic transfer of pressure is interchangeably referred to as "hydraulically communicating" or components being "hydraulically coupled."

Typically, the high pressure hydraulic fluid is supplied to the cat tracks 108 or rail wheels 111 through swivel bearing 110 at a swivel bearing central axis (not shown), allowing the rotating platform 101, and excavator 100, to slew 360 degrees unhindered.

As noted above, prior art high rail drive systems 120 allow self-propelled heavy equipment to operate in a cat drive/off-rail mode in which the self-propelled heavy equipment, such as excavator 100, can travel under their own power on tracks, such as cat tracks, or wheels/tires, at a worksite. As also noted above, prior art high rail drive systems allow self-propelled heavy equipment, such as, excavator 100, to operate in a rail wheel drive/on-rail mode so that the heavy equipment, such as excavator 100, can propel themselves on the rails of the railroad system using rail wheel systems to get back and forth to the worksite.

Referring to FIGS. 1A, 1B, and 1E, excavator 100, is shown in the cat drive/off-rail mode in which the excavator 100 can travel under its own power on its own cat tracks 108.

Referring to FIGS. 1C, 1D, and 1E, excavator 100 is shown in the rail wheel drive/on-rail mode in which the excavator 100 can travel under its own power on standard railroad tracks 199 using rail wheels 111.

As shown in FIG. 1E, undercarriage 107 includes prior art high rail drive system 120. As seen in FIGS. 1C, 1D, and 1E, prior art high rail drive system includes rail wheels 111 attached to rail wheel drive axels 109. The engine (not shown) in a standard hydraulic excavator, such as excavator 100, serves to drive the hydraulic pumps (not shown). Generally, a hydraulic excavator, such as excavator 100, comprises one or more variable displacement pumps that supply oil at high pressure to the arms, swing motor, track motors, and accessories.

While, as noted above, prior art high rail drive systems, such as prior art high rail drive system 120, represent a significant improvement over the prior art flatbed railroad car methods, prior art high rail drive systems, such as prior art high rail drive system 120, historically have several issues arising from several long-standing technical problems.

First, prior art high rail drive systems, such as prior art high rail drive system 120, have a hydraulic fluid back pressure problem that, at a minimum, results in increased stress and wear and tear on the entire hydraulic systems of equipment implementing prior art high rail drive systems, such as prior art high rail drive system 120.

Worse yet, the hydraulic fluid back pressure problems associated with prior art high rail drive systems, such as prior art high rail drive system 120, can, and too often do, result in hydraulic system failures. These failures often occur in the field, and often in remote locations. This, in turn, not only represents a problem for railroad operators, but in some cases, can represent a threat to interstate commerce via a ripple effect spanning thousands of miles.

In normal powered operation, the hydraulic pumps of standard hydraulic equipment, such as excavator 100, pull hydraulic fluid from a reservoir, or tank, and push the hydraulic fluid throughout the hydraulic equipment, including the rail wheel drive system, through hydraulic lines and into the rail wheel drive axel motors. When in this powered state, the rail wheels rotate and move the heavy equipment down the railroad tracks under hydraulic power. The rail wheel drive axel motors then push the hydraulic fluid back out into the reservoir. All this is exactly as intended when the system is in powered operation.

However, the back pressure problem associated with prior art high rail drive systems, such as prior art high rail drive system 120, arises in unpowered operation when the drive system is in the neutral, unpowered state, and hydraulic pressure is removed. In this neutral, or coasting, state, the rail wheels rotate independently from the hydraulic pump system, i.e., they are free rolling along the railroad tracks. This occurs in normal unpowered operation such as when the hydraulic equipment, such as excavator 100, is free rolling or coasting along the railroad track on the rail wheels of the prior art high rail drive systems, such as prior art high rail drive system 120. However, when this coasting happens as part of normal operation, the rail wheel drive axel motors and rail drive system act as a reverse flow pump pulling hydraulic fluid from the hydraulic lines into the rail wheel drive axel motors and rail drive system, while simultaneously pushing hydraulic fluid back into the entire hydraulic system of the hydraulic equipment. This reverse pumping action then causes a buildup of pressure in the entire hydraulic system often resulting in extreme pressure in the entire hydraulic system.

This extreme pressure buildup from the rail wheel drive axels motors in the neutral, unpowered state, causes, at a minimum, an undue stress on the components and lines of entire equipment hydraulic system. In addition, this extreme pressure from the rail wheel drive axel motors in the unpowered state all too often causes failure of the equipment hydraulic system. As a result, equipment, such as excavator 100, is often inoperably stranded in the field and left on the railroad tracks; virtually closing down all traffic on the effected section of track for extended periods of time while repairs are made.

Repairing a failed equipment hydraulic system can easily run into the tens, or hundreds, of thousands of dollars. Consequently, the inherent increased risk, and actual occurrence, of hydraulic system failure associated with prior art high rail drive systems, such as prior art high rail drive system 120, is a potentially extremely costly situation for railroad operators in terms of the time, money, and resources that must currently be dedicated to these inherent hydraulic system failures.

Clearly, the increased risk of hydraulic system failure associated with prior art high rail drive systems, such as prior art high rail drive system 120, is a potentially costly situation for railroad operators in terms of the time, money, and resources that must currently be dedicated to these inherent hydraulic system failures. However, the severity of the situation is even more pronounced when it is considered that a hydraulic system failure, and addressing such a failure, can stop traffic on a given section of railroad for hours, even days, depending on location, weather, etc. Again, not only is this a disaster for the railroad provider and the railroad system but it can also mean entire sections of the country, that are often tens, hundreds, even thousands of miles away from the failure, are backed up and freight can be delayed across an entire section of the country.

This is no small issue since even an hour's delay on one section of track can back up freight traffic from coast to coast. This has the potential to interrupt deliveries, with perishable items being rendered valueless, to halt production of entire industries until parts and raw material arrive, and to disrupt schedules and deadlines across vast distances. Consequently, the inherent risk of hydraulic system failure associated with prior art high rail drive systems, such as prior art high rail drive system 120, represents a real threat to the smooth operation of interstate commerce, and to the entire economy.

Some prior "solutions" to the back pressure issues associated with prior art high rail drive systems, such as prior art high rail drive system 120, have been proposed. However, the currently proposed/available solutions make use of complicated, expensive, and often heavy, electronic and mechanical components that add significant weight to the high rail drive system and have numerous moving and electronic parts that are subject to failure and therefore arguably present as many new potential problems as they solve.

In addition to the back pressure issues discussed above, prior art high rail drive systems, such as prior art high rail drive system 120, also suffer from cavitation issues. Cavitation arises when hydraulic fluid pressure to the rail wheel drive axel motors decreases in an unpowered or neutral state, such as when drive power is released and the system is coasting, and/or when brakes are applied. Using prior art high rail drive systems, such as prior art high rail drive system 120, when the drive power is released, hydraulic fluid pressure to the rail wheel drive axel motors is rapidly decreased and the rail wheel drive axel motors again act as a reverse pump. This pumping action forces the hydraulic fluid out of the rail wheel drive axel motors so that the rail wheel drive axel motors continue to pump in a dry state, i.e., with little or no hydraulic fluid present to lubricate the motor components. Thus, using high rail drive system, rail wheel drive axel motors are forced into a cavitation state where the rail wheel drive axel motors are running without the lubrication provided by the hydraulic fluid.

Operation in this cavitation state causes significant friction and associated heat buildup that causes significant wear and tear on the rail wheel drive axel motors. The wear and tear on the rail wheel drive axel motors is so significant that the rail wheel drive axel motors used with prior high rail drive systems rarely last more than 2000 hours. Consequently, to avoid unpredictable breakdowns, the rail wheel drive axel motors used with prior art high rail drive systems must be replaced before, or at, 2000 hours of operation.

Rail wheel drive axel motors cost from tens to hundreds of thousands of dollars. In addition, these motors must typically be replaced back at a base station, or, in some cases, in the field. Either way the replacement incurs the cost of the motors, the time of a technician, and the cost of transporting either the equipment or the motors. In addition, there is the cost of equipment down time and the potential shutting down of large sections of the railroad system with the ensuing ripple effect discussed above. Again, clearly this is not an efficient or cost effective system and is a significant issue and pain point for railroad operators and the railroads system as a whole.

Another issue associated with prior art high rail drive systems, such as prior art high rail drive system 120, is that the hydraulically driven rail wheels do not operate in a true four-wheel drive mode. This is because using prior art high rail drive systems, such as prior art high rail drive system 120, the rail wheel drive axels operate independently, often at significantly different hydraulic pressures. As a result, relative high pressure can be provided to one pair of rail wheels on one rail wheel drive axel while relatively low hydraulic pressure is provided to another pair of rail wheels on another rail wheel drive axel. This, of course, results in unequal/uneven forces being applied to the rail wheel drive axels so that the rail wheels on one end of the high rail drive system are either dragging or pushing with respect to the rail wheels on another end of the high rail drive system. This situation is not only inefficient, but it can also result in uneven wear and tear on the rail wheel drive axel motors, rail wheel axels, and the rail wheels themselves. Again this is a clearly inefficient and unduly costly situation.

In addition, prior art high rail drive systems, such as prior art high rail drive system 120, typically use relatively small, and relatively weak, rail wheel drive axel motors. To counteract this use of small rail wheel drive axel motors, prior art high rail drive systems, such as prior art high rail drive system 120, must be connected to separate gearing systems in a broken, e.g., multiple drive shaft section, configuration to obtain the necessary power and torque needed to provide effective drive power to the rail wheel axel and the rail wheels.

This represents inefficiencies in several ways. First the weight of the system is increased by the addition of these significant gearing systems and drive shaft sections. Second, the gearing up of the small rail wheel drive axel motors puts unneeded stress on both the rail wheel drive axel motors and the entire drive system. In addition, the prior art gearing systems required by the use of small rail wheel drive axel motors with prior art high rail drive systems, such as prior art high rail drive system 120, means more moving parts to fail and/or be maintained. Again, this represents a significant inefficiency associated with prior art high rail drive systems, such as prior art high rail drive system 120.

As discussed above, prior art methods and systems for providing high rail drive systems suffer from long-standing reliability, cost, and efficiency problems. To large degree these reliability, cost, and efficiency problems are the result of back pressure issues, cavitation issues, uneven drive issues, and rail axel drive motor issues that are inherent in the prior art methods and systems for providing high rail drive systems.

Consequently, there is a long-standing technical problem of providing improved high rail drive systems that do not suffer from the prior art back pressure issues, cavitation issues, uneven drive issues, and rail axel drive motor issues and therefore are reliable, cost effective, and efficient.

What is needed is a method and system that provides a technical solution to the prior art back pressure issues, cavitation issues, uneven drive issues, and rail axel drive motor issues associated with high rail drive systems.

SUMMARY

Disclosed herein are various embodiments of a method and system that provide a technical solution to the long-standing technical problem of providing high rail drive systems that do not suffer from the prior art back pressure issues, cavitation issues, uneven drive issues, and rail axel drive motor issues and therefore are reliable, cost effective, and efficient.

In one embodiment, the disclosed method and system includes an improved high rail drive system that utilizes one or more counterbalance units to provide dynamic braking and thereby minimize hydraulic back pressure from the rail wheel drive axel motors when the disclosed high rail drive system in the neutral state and the rail wheels are unpowered and coasting.

In one embodiment, the disclosed method and system includes an improved high rail drive system that utilizes a dedicated cavitation prevention pump to provide a constant supply of hydraulic fluid to the rail wheel drive axel motors when rail wheels are unpowered and coasting to keep hydraulic fluid in the rail wheel drive axel motors to avoid the cavitation state.

In one embodiment, the disclosed method and system includes an improved high rail drive system that utilizes and a compensator unit that allows hydraulic fluid pressure to be equalized between the rail wheel drive axel motors, and therefore the drive axels and drive axel on-rail components, such as rail drive wheels, of the disclosed high rail drive system. This ensures equalized drive forces on the rail wheels and true four wheel drive for the disclosed high rail drive system.

In one embodiment, the disclosed method and system includes an improved high rail drive system that further utilizes powerful four port rail wheel drive axel motors and single shaft through motor configurations. These powerful motor and single/through shaft configurations do not require extensive and complicated gearing systems to obtain the necessary power and torque need to provide effective drive power to the rail wheel axel and the rail wheels.

Consequently, the disclosed methods and systems provide a technical solution to the long-standing technical problem of providing high rail drive systems that do not suffer from the prior art back pressure issues, cavitation issues, uneven drive issues, and rail axel drive motor issues and therefore are reliable, cost effective, and efficient.

In one embodiment, the disclosed method and system includes an improved high rail drive system that utilizes counterbalance units implemented between a diverter and rail wheel drive axel motor for each rail wheel drive axle of the disclosed high rail drive system.

In one embodiment, the counterbalance units restrict the flow of hydraulic fluid from the rail wheel drive axel motors back to a reservoir tank of the equipment-based hydraulic supply sub-system when the system is in the neutral or coasting state. In one embodiment, when the hydraulic pressure to the rail wheel drive axel motors of the disclosed high rail drive system decreases below a threshold level, such as when the rail wheel drive axel motors are unpowered and coasting, the disclosed counterbalance units provide dynamic braking in the hydraulic system similar to that of jake brakes in truck exhaust systems.

Consequently, using the disclosed embodiments, the pulling of hydraulic fluid from the hydraulic lines into the rail wheel drive axel motors and simultaneous pushing the hydraulic fluid back into the hydraulic system when the rail wheel drive axel motors are unpowered is minimized. As a result, the buildup of extreme back pressure in the hydraulic system of the disclosed high rail drive system is avoided.

In one embodiment, the disclosed method and system includes an improved high rail drive system that further utilizes a dedicated cavitation prevention pump to provide a constant supply of hydraulic fluid to the rail wheel drive axel motors of the disclosed high rail drive system when the rail wheel drive axel motors are unpowered, e.g., when the hydraulic pressure to the rail wheel drive axel motors decreases below a threshold level such as when the rail wheel drive axel motors are unpowered and coasting.

By providing constant supply of hydraulic fluid to the rail wheel drive axel motors of the high rail drive system when they are unpowered, enough hydraulic fluid is provided to prevent cavitation and the prevent the stress and damage to the rail wheel drive axel motors that is associated with cavitation.

In one embodiment, the disclosed method and system includes an improved high rail drive system that further utilizes a compensator unit, in one embodiment, a limited slip valve compensator unit, implemented between rail wheel drive axel motor hydraulic lines of the high rail drive system. The compensator unit senses hydraulic pressure in the hydraulic lines of the wheel drive axel motors. When a threshold differential is detected between the hydraulic pressure in the hydraulic lines of the wheel drive axel motors, the compensator unit allows hydraulic fluid pressure to be equalized between rail wheel drive axel motors of the disclosed high rail drive system by pressure activated valves that allow hydraulic fluid to flow from the hydraulic lines of one wheel drive axel motor to the hydraulic lines of the other wheel drive axel motor until the hydraulic pressure on the hydraulic lines of the wheel drive axel motors is equalized to below threshold differential value and the valve closes.

In this way, true four wheel drive is provided for the disclosed high rail drive system by ensuring balanced hydraulic pressure on the hydraulic lines of the wheel drive axel motors, and therefore relatively equal drive forces on the rail wheels of the disclosed high rail drive system. As a result, the rail wheels on one end of the high rail drive system are neither dragging nor pushing with respect to the rail wheels on another end of the high rail drive system. This minimizes the inefficiency and uneven wear and tear on the rail wheel drive axel motors, rail wheel axels, and the rail wheels themselves of the disclosed high rail drive system that is associated with unequal hydraulic fluid pressure being provided to rail wheel drive axel motors.

In one embodiment, the disclosed method and system includes an improved high rail drive system that further utilizes relatively powerful four port rail wheel drive axel motors and single shaft through motor configurations. These powerful motor and single/through shaft configurations do not require extensive and complicated gearing systems to obtain the necessary power and torque need to provide effective drive power to the rail wheel axel and the rail wheels.

This results in reduced weight of the disclosed high rail drive system, reduced stress on the rail wheel drive axel motors and the entire drive system, and fewer moving parts to fail and/or be maintained.

Therefore, the disclosed methods and systems provide an improved high rail drive system that minimizes or eliminates back pressure issues, cavitation issues, uneven drive issues, and rail axel drive motor complexity issues that are inherent in the prior art systems. As a result, the disclosed methods and systems provide improved high rail drive systems that are reliable, cost effective, and efficient, and relatively light weight with fewer moving and electronics.

Consequently, as discussed in more detail below, the disclosed methods and systems provide a technical solution to the is the long-standing technical problem of providing high rail drive systems that do not suffer from the prior art back pressure issues, cavitation issues, uneven drive issues, complexity, and rail axel drive motor issues.

Figure 1A:
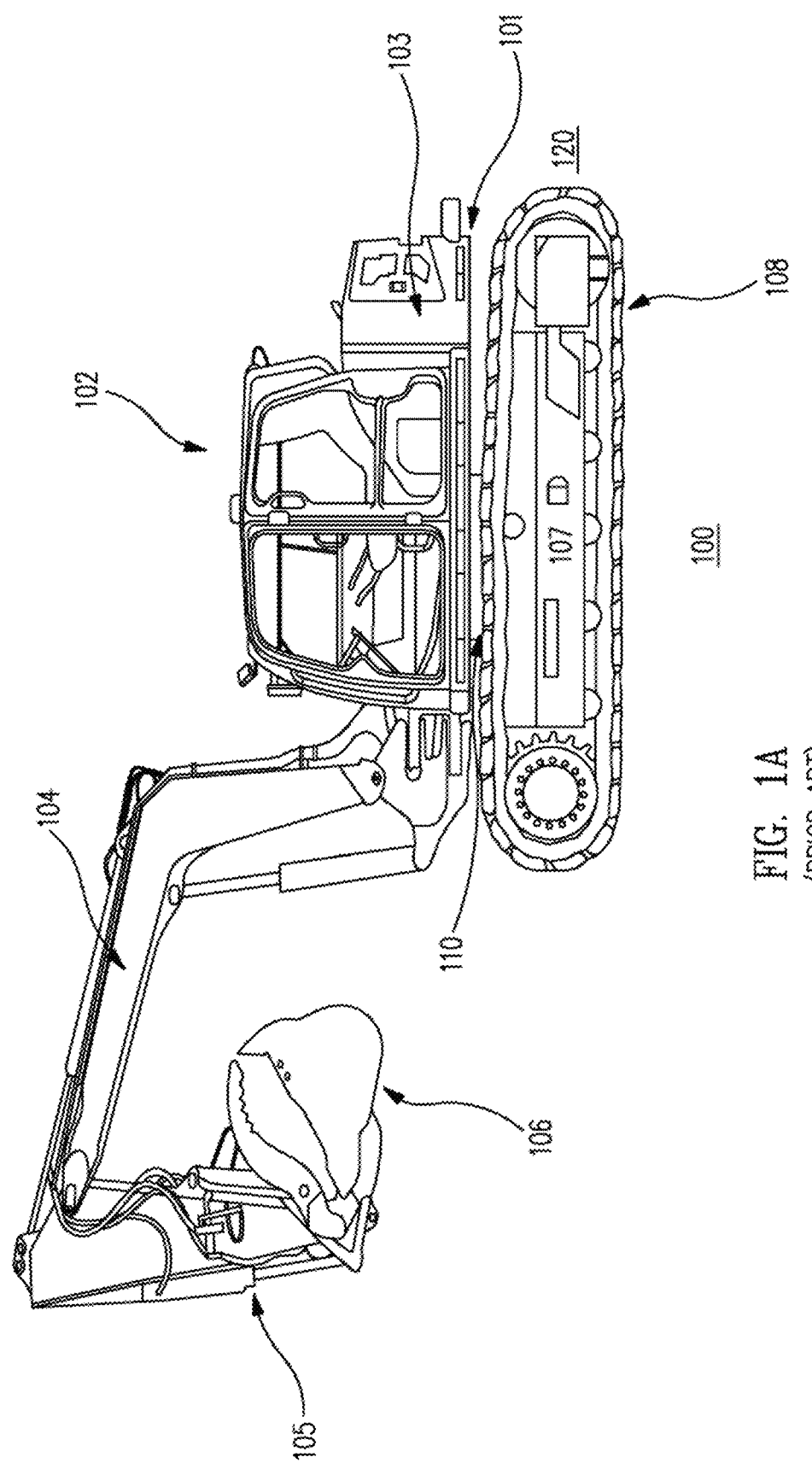
FIG. 1A is a photograph of a prior art high rail drive system implemented on an excavator in the cat drive/off-rail operating mode.
Figure 1B:
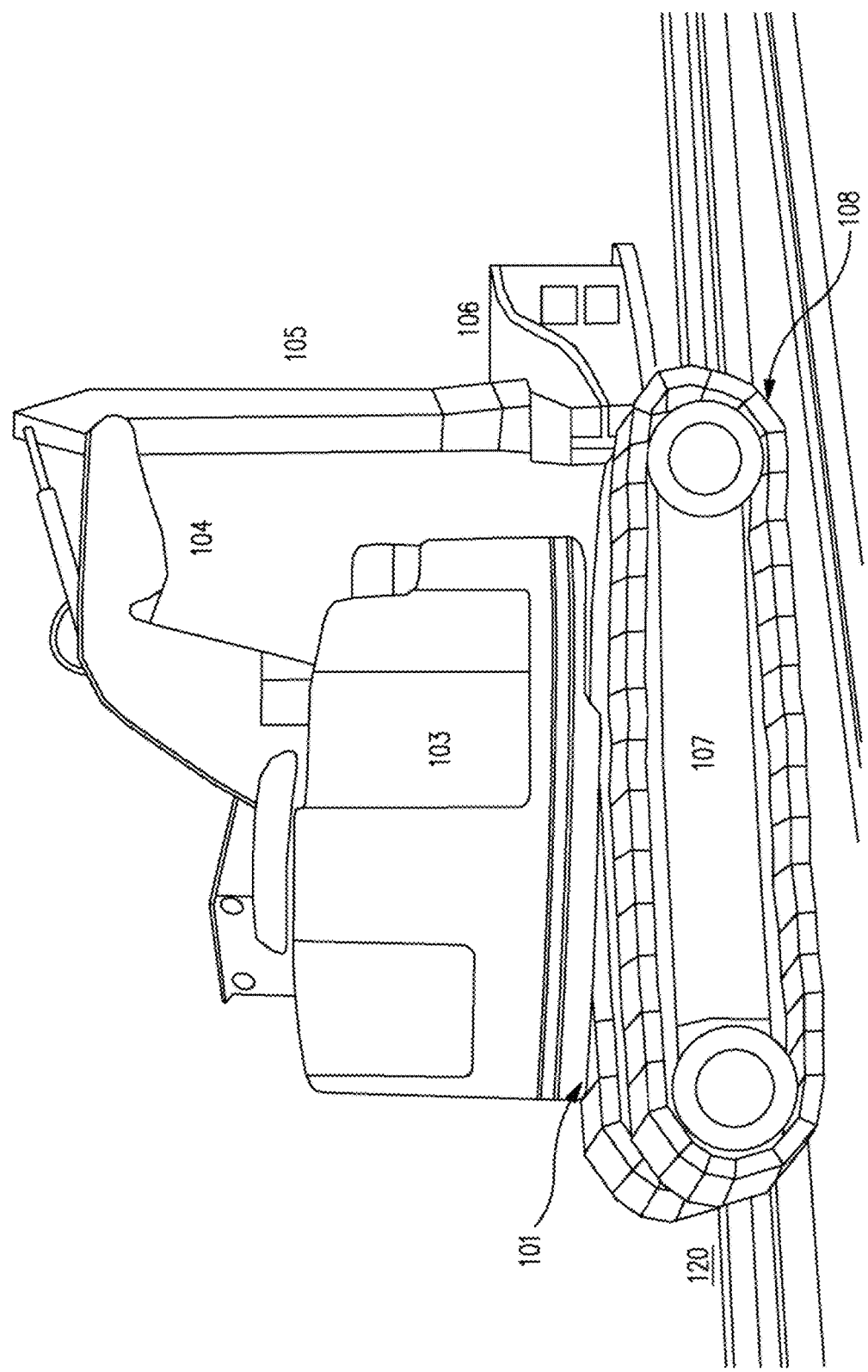
FIG. 1B is a second photograph of the prior high rail drive system implemented on an excavator of FIG. 1A in the cat drive/off-rail operating mode.
Figure 1C:
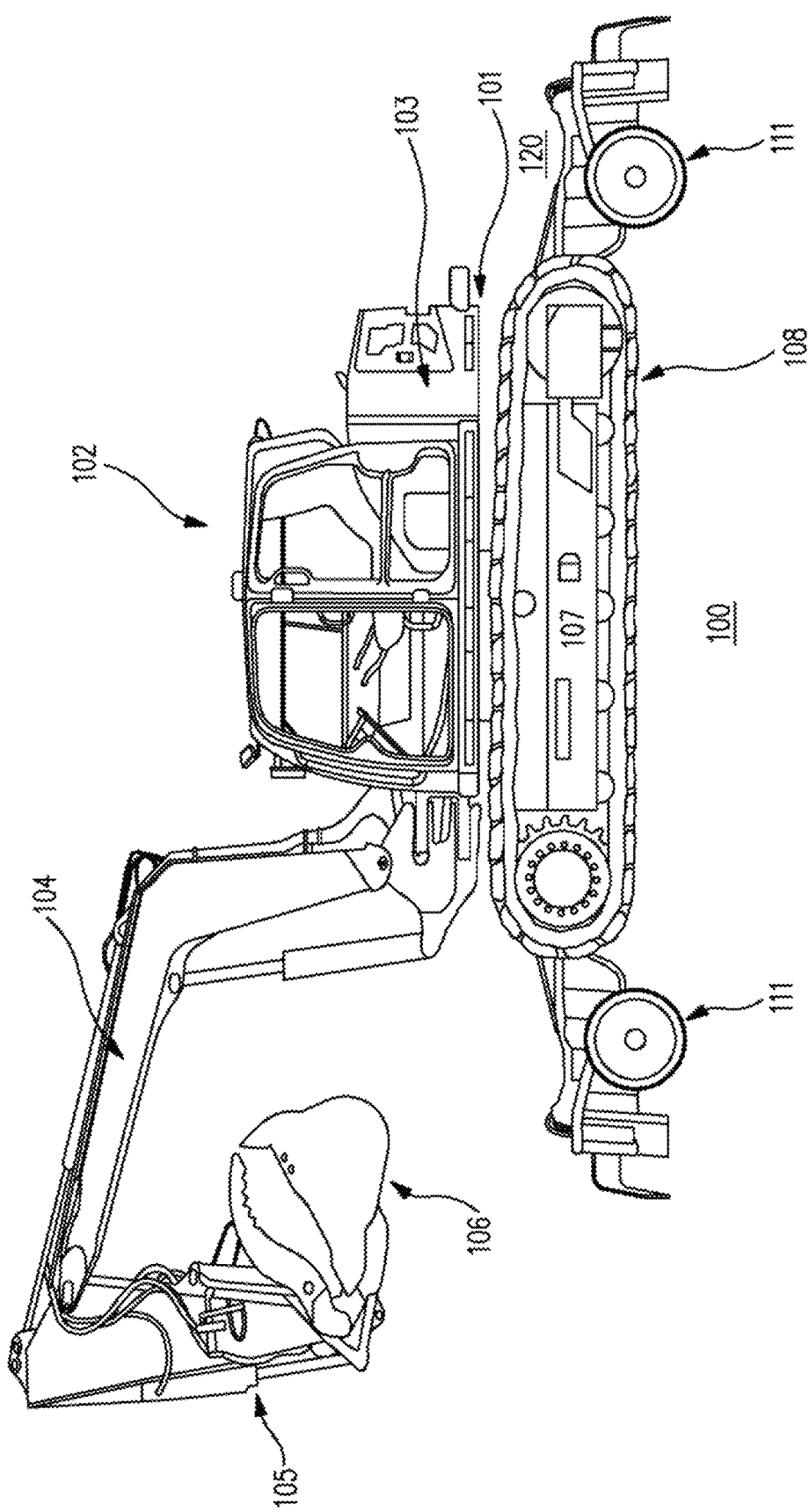
FIG. 1C is a photograph of the prior art high rail drive system implemented on an excavator of FIG. 1A in the rail wheel drive/on-rail operating mode.
Figure 1D:
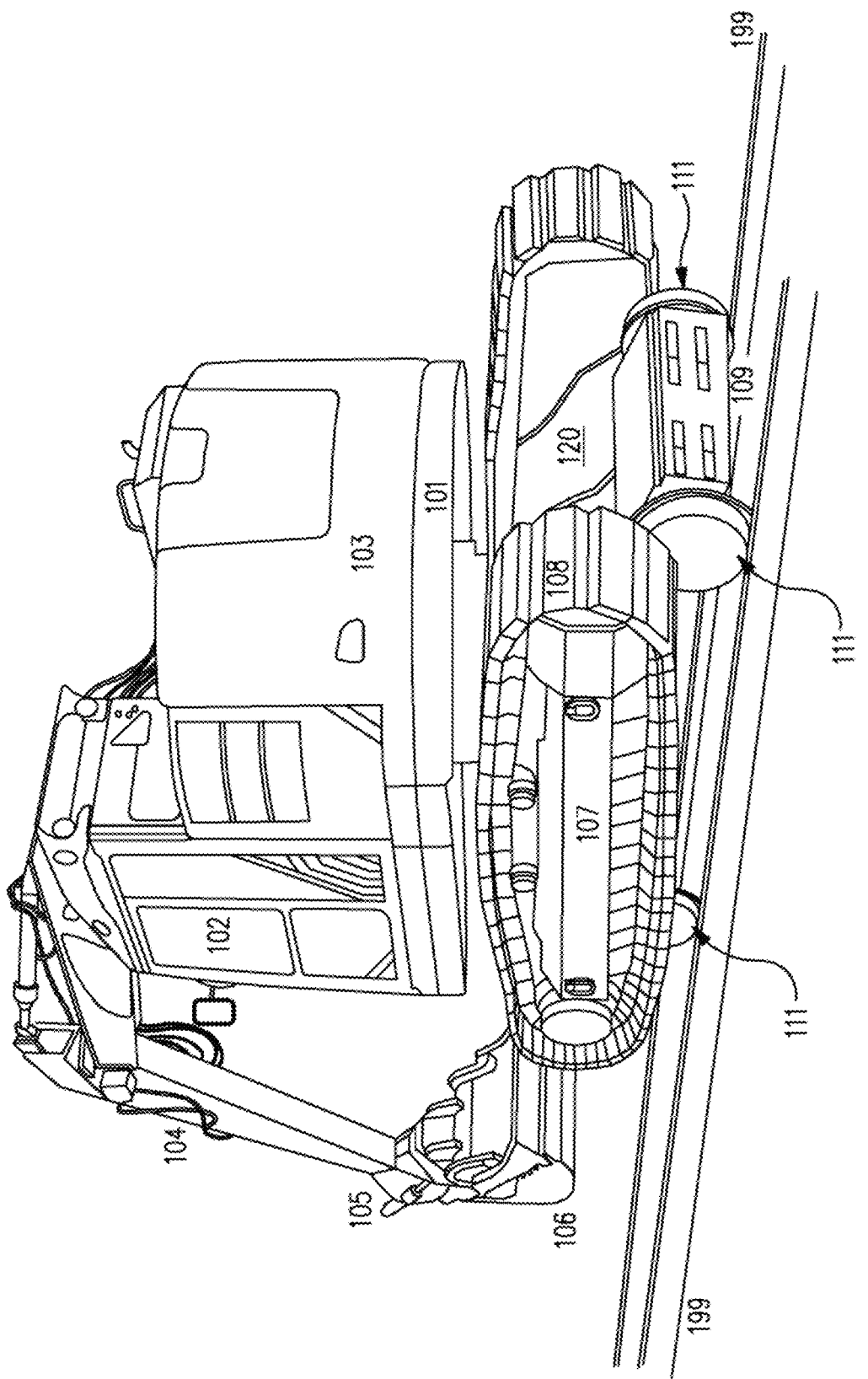
FIG. 1D is a second photograph of the prior art high rail drive system implemented on an excavator of FIG. 1C in the rail wheel drive/on-rail operating mode.
Figure 1E:
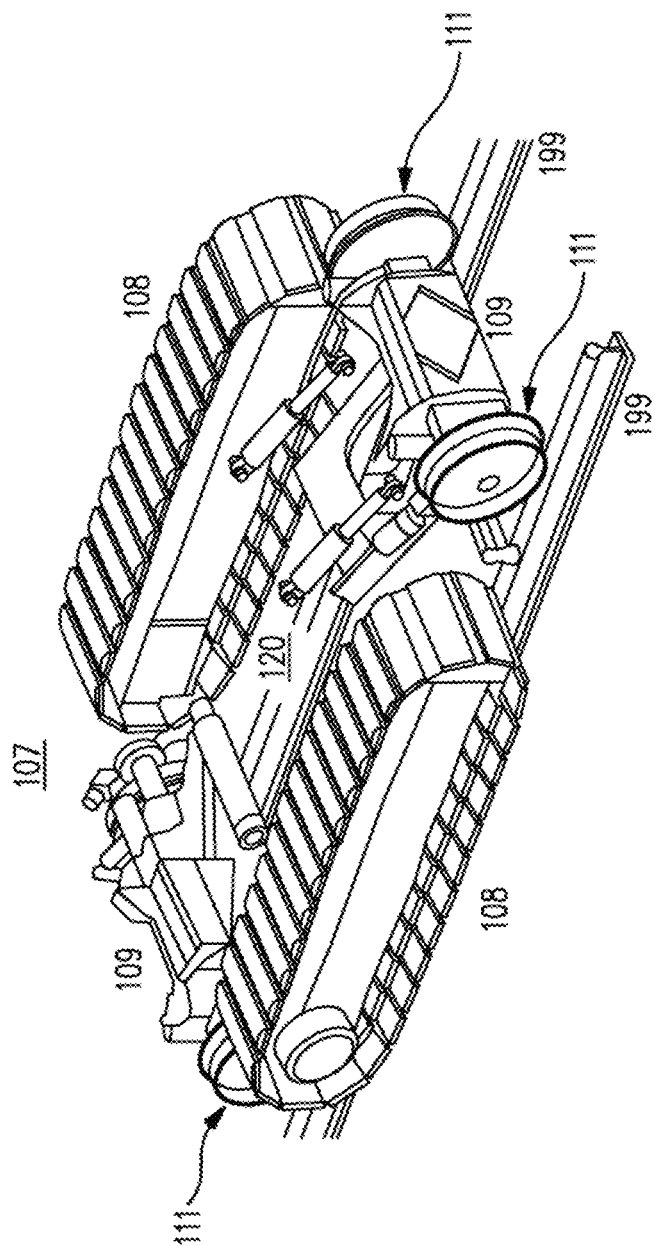
FIG. 1E is a drawing of a typical prior art high rail drive system.

Common reference numerals are used throughout the figures and the detailed description to indicate like elements. One skilled in the art will readily recognize that the above figures are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying figures (FIGS.), which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

Disclosed herein are various embodiments of a method and system that provide a technical solution to the long-standing technical problem of providing high rail drive systems that do not suffer from the prior art back pressure issues, cavitation issues, uneven drive issues, and rail axel drive motor issues, and therefore are reliable, cost effective, and efficient.

In one embodiment, the disclosed method and system includes an improved high rail drive system that utilizes one or more counterbalance units to provide dynamic braking and thereby minimize hydraulic back pressure from the rail wheel drive axel motors when the disclosed high rail drive system in the neutral state and the rail wheels are unpowered and coasting.

In one embodiment, the disclosed method and system includes an improved high rail drive system that utilizes a dedicated cavitation prevention pump to provide a constant supply of hydraulic fluid to the rail wheel drive axel motors to prevent cavitation, including when rail wheels are unpowered and coasting.

In one embodiment, the disclosed method and system includes an improved high rail drive system that utilizes and a compensator unit that allows hydraulic fluid pressure to be equalized between the rail wheel drive axel motors, to ensure equalized drive forces on the rail wheels and true four wheel drive for the disclosed high rail drive system.

In one embodiment, the disclosed method and system includes an improved high rail drive system that utilizes four port rail wheel drive axel motors and single shaft through motor configurations that do not require extensive and complicated gearing systems.

Consequently, the disclosed methods and systems provide a technical solution to the long-standing technical problem of providing high rail drive systems that do not suffer from the prior art back pressure issues, cavitation issues, uneven drive issues, and rail axel drive motor issues and therefore are reliable, cost effective, and efficient.

Figure 2A:
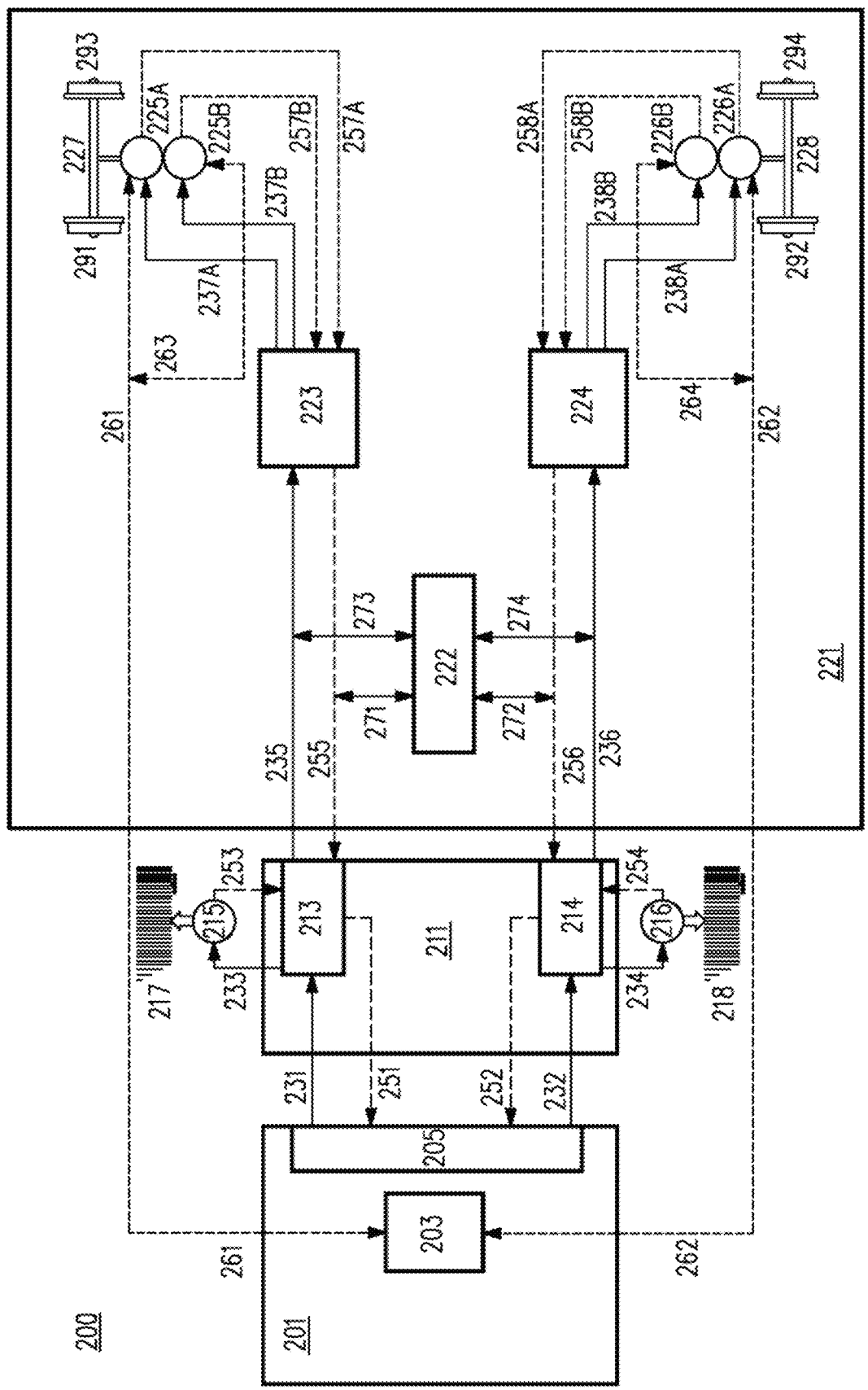
FIG. 2A is a block diagram and high level hydraulic schematic drawing of one embodiment of the disclosed high rail drive system showing various components and hydraulic line plumbing.

FIG. 2A is a block diagram/high level schematic drawing of one embodiment of the disclosed improved high rail drive system 200 showing various components and hydraulic lines/plumbing in accordance with one embodiment.

As seen in FIG. 2A, improved high rail drive system 200 includes equipment-based hydraulic supply sub-system 201, off-rail drive sub-system 211, and on-rail drive sub-system 221.

In one embodiment, equipment-based hydraulic supply sub-system 201 is part of a piece of heavy equipment (not shown), such as an excavator, a bull dozer, a crane, or any other piece of hydraulically driven equipment as discussed herein, and/or as known/available in the art at the time of filing, and/or as made known/available after the time of filing.

Returning to FIG. 2A, in one embodiment, all movement and functions of a piece of hydraulic equipment are accomplished through the use of hydraulic fluid via use of hydraulic cylinders and hydraulic motors (not shown). In one embodiment, the piece of hydraulic equipment is attached to the disclosed high rail drive system 200 by way of a swivel bearing (not shown in FIG. 2A).

As noted above, herein, hydraulic transfer of pressure is interchangeably referred to as "hydraulically communicating" or components being "hydraulically coupled."

In one embodiment, the hydraulic fluid is supplied to the various components of high rail drive system 200 using one or more hydraulic motors (not shown in FIG. 2A). In one embodiment, hydraulic fluid is supplied from fluid reservoir 205, pressurized by the one or more hydraulic motors (not shown in FIG. 2A).

As discussed in more detail below, the high pressure hydraulic fluid is then used to hydraulically couple the various components of high rail drive system 200 by way of high pressure hydraulic lines (shown as solid lines in FIGS. 2A, 2B, and 2C). Then the high pressure hydraulic fluid performs the desired functions and, in the process is transformed into low pressure hydraulic fluid. The low pressure hydraulic fluid is then returned to fluid reservoir 205 by way of return hydraulic fluid lines (shown as dashed lines in FIGS. 2A, 2B, and 2C).

Also shown in FIG. 2A is cavitation prevention pump 203. As discussed in more detail below, cavitation prevention pump 203 provides supplementary hydraulic fluid to first low speed axel drive motor 225A, via supplemental hydraulic fluid line 261, first high-speed axel drive motor 225B, via supplemental hydraulic fluid line 263, second low speed axel drive motor 226A, via supplemental hydraulic fluid line 262, and second high-speed axel drive motor 226B, via supplemental hydraulic fluid line 264.

As discussed in more detail below, In one embodiment, cavitation prevention pump 203 is used to provide a constant supply of hydraulic fluid to the rail wheel drive axel motors 225A, 225B. 226A, and 226B when on-rail components 291, 293, 292, and 294, in this example rail wheels, are unpowered and coasting. This keeps hydraulic fluid in the rail wheel drive axel motors 225A, 225B, 226A, and 226B at all times and thereby prevents cavitation.

As also discussed below, in various embodiments, rail wheel drive axel motors 225A, 225B can be housed and/or compartmented in the same motor housing. Similarly, rail wheel drive axel motors 226A, and 226B can also be housed and/or compartmented in the same motor housing.

In one embodiment, high pressure hydraulic fluid line 231 is used to provide high pressure hydraulic fluid to first diverter unit 213 of off-rail drive sub-system 211. Similarly, in one embodiment, high pressure hydraulic fluid line 232 is used to provide high pressure hydraulic fluid to second diverter unit 214 of off-rail drive sub-system 211.

In one embodiment, in off-rail operation, first diverter unit 213 uses high pressure hydraulic fluid line 233 to divert the high pressure hydraulic fluid from high pressure hydraulic fluid line 231 to off-rail drive component drive motor 215 which uses the high pressure hydraulic fluid to power first off-rail drive component 217, in this example a cat track.

In one embodiment, in off-rail operation, the resulting low pressure hydraulic fluid is then returned to first diverter unit 213 by return hydraulic fluid line 253.

In one embodiment, in off-rail operation, first diverter unit 213 then returns the low pressure hydraulic fluid to fluid reservoir 205 by way of return hydraulic fluid line 251 for re-pressurization to high pressure hydraulic fluid.

Similarly, in one embodiment, in off-rail operation, second diverter unit 214 uses high pressure hydraulic fluid line 233 to divert the high pressure hydraulic fluid from high pressure hydraulic fluid line 232 to off-rail drive component drive motor 216 which uses the high pressure hydraulic fluid to power second off-rail drive component 218, in this example a cat track.

In one embodiment, in off-rail operation, the resulting low pressure hydraulic fluid is then returned to second diverter unit 214 by return hydraulic fluid line 254. In one embodiment, in off-rail operation, second diverter unit 214 then returns the low pressure hydraulic fluid to fluid reservoir 205 by way of return hydraulic fluid line 252 for re-pressurization to high pressure hydraulic fluid.

In this way, in off-rail operation, off-rail drive components 217 and 218 are powered and controlled. As noted, in the specific illustrative example of FIGS. 2A, 2B, and 2C, the off-rail drive components 217 and 218 are cat tracks. However, in other embodiments, off-rail drive components 217 and 218 can be wheels, tires, or any other off-rail drive components capable of hydraulic operation, as discussed herein, and/or as known/available in the art at the time of filing, and/or as made known/available after the time of filing.

In one embodiment, in on-rail operation, first diverter unit 213 is used to divert the high pressure hydraulic fluid from high pressure hydraulic fluid line 231 to on-rail drive sub-system 221 and first counterbalance unit 223 by way of high pressure hydraulic fluid line 235.

Similarly, in one embodiment, in on-rail operation, second diverter unit 214 is used to divert the high pressure hydraulic fluid from high pressure hydraulic fluid line 232 to on-rail drive sub-system 221 and second counterbalance unit 224 by way of high pressure hydraulic fluid line 236.

As discussed in more detail below, in one embodiment, first and second counterbalance units 223/224 are used to prevent the high pressure back flow issues associated with prior art systems discussed above. In one embodiment, first and second counterbalance units 223/224 restrict the flow of hydraulic fluid from the rail wheel drive axel motors 225A, 225B, 226A, and 226B along hydraulic fluid lines 237A, 237B, 257A, 257B, 238A, 238B, 258A, and 258B, 235, 255, 236, 256, 231, 251, 232, and 252 back to fluid reservoir 205 when high rail drive system 200 is in the neutral or coasting state.

In one embodiment, when the hydraulic fluid pressure on high pressure hydraulic lines 235, 236, 237A. 237B, 238A, and 238B to the rail wheel drive axel motors 225A, 225B, 226A, and 226B decreases below a threshold level, such as when the rail wheel drive axel motors 225A. 225B, 226A, and 226B are unpowered, and on-rail components 291, 293, 292, 294, in this example rail wheels, are therefore coasting, first and second counterbalance units 223/224 react to this drop in pressure and use counterbalance valves to provide dynamic braking in the hydraulic system similar to that of jake brakes in truck exhaust systems.

Consequently, using the disclosed embodiments, the pulling of hydraulic fluid from the hydraulic lines into the rail wheel drive axel motors and simultaneous pushing the hydraulic fluid back into the hydraulic system when the rail wheel drive axel motors are unpowered is minimized. As a result, the buildup of back pressure in the hydraulic system of the disclosed high rail drive system 200 is minimized/avoided.

Those of skill in the art will recognize that first and second counterbalance units 223/224 can be any one or more of numerous types of counterbalance units known in the art. Consequently, a more detailed discussion of any particular type of counterbalance unit is omitted here to avoid detracting from the invention.

As noted above, in this same unpowered state, cavitation prevention pump 203 provides supplementary hydraulic fluid to first low speed axel drive motor 225A, via supplemental hydraulic fluid line 261, first high-speed axel drive motor 225B, via supplemental hydraulic fluid line 263, second low speed axel drive motor 226A, via supplemental hydraulic fluid line 262, and second high-speed axel drive motor 226B, via supplemental hydraulic fluid line 264.

In this way, when the rail wheel drive axel motors 225A, 225B, 226A, and 226B are unpowered and on-rail components 291, 293, 292, 294 are coasting, or the hydraulic pressure to the rail wheel drive axel motors 225A, 225B, 226A, and 226B decreases for any reason, a constant small supply of hydraulic fluid is still provided to the rail wheel drive axel motors 225A, 225B, 226A, and 226B.

By providing this constant small supply of hydraulic fluid to the rail wheel drive axel motors 225A, 225B, 226A, and 226B, even when they are unpowered, enough hydraulic fluid is provided to prevent cavitation and the prevent the stress and damage to rail wheel drive axel motors 225A, 225B, 226A, and 226B that is associated with cavitation.

As seen in FIG. 2A, in one embodiment, first counterbalance unit 223 is implemented between high pressure hydraulic fluid line 235 and wheel drive axel motors 225A. 225B. In one embodiment, high pressure hydraulic fluid on high pressure hydraulic fluid line 235 is conveyed through first counterbalance unit 223 to first low speed axel drive motor 225A by way of high pressure hydraulic fluid line 237A. Similarly, in one embodiment, high pressure hydraulic fluid on high pressure hydraulic fluid line 235 is conveyed through first counterbalance unit 223 to first high-speed axel drive motor 225B by way of high pressure hydraulic fluid line 237B.

The high pressure hydraulic fluid conveyed to first low speed axel drive motor 225A and/or first high-speed axel drive motor 225B is then used to power first drive axel 227 and thereby cause first drive axel on-rail component 291 and first drive axel on-rail component 293, in this illustrative example rail wheels, to rotate and propel the equipment, such as excavator 100 of FIG. 1A, along the railroad tracks.

Returning to FIG. 2A, once first low speed axel drive motor 225A and/or first high-speed axel drive motor 225B are used to power first drive axel 227 and the high pressure hydraulic fluid becomes low pressure hydraulic fluid, the low pressure hydraulic fluid is transferred back to fluid reservoir 205 by way of low pressure hydraulic fluid lines 257A, 257B, 255, and 251.

Similarly, as seen in FIG. 2A, in one embodiment, second counterbalance unit 224 is implemented between high pressure hydraulic fluid line 236 and wheel drive axel motors 226A, 226B. In one embodiment, high pressure hydraulic fluid on high pressure hydraulic fluid line 236 is conveyed through second counterbalance unit 224 to second low speed axel drive motor 226A by way of high pressure hydraulic fluid line 238A. Similarly, in one embodiment, high pressure hydraulic fluid on high pressure hydraulic fluid line 236 is conveyed through second counterbalance unit 224 to second high-speed axel drive motor 226B by way of high pressure hydraulic fluid line 238B.

The high pressure hydraulic fluid conveyed to second low speed axel drive motor 226A and/or second high-speed axel drive motor 226B is then used to power second drive axel 228 and thereby cause second drive axel on-rail component 292 and second drive axel on-rail component 294, in this illustrative example rail wheels, to rotate and propel the equipment, such as excavator 100 of FIG. 1A, along the tracks.

Returning to FIG. 2A, once second low speed axel drive motor 226A and/or second high-speed axel drive motor 226B are used to power second drive axel 228 and the high pressure hydraulic fluid becomes low pressure hydraulic fluid, the low pressure hydraulic fluid is transferred back to fluid reservoir 205 by way of low pressure hydraulic fluid lines 258A, 258B, 256, and 252.

As noted above, with respect to prior art systems, if the pressure of the high pressure hydraulic fluid provided to first low speed axel drive motor 225A and/or first high-speed axel drive motor 225B used to power second drive axel 227 is significantly higher or lower than the pressure of the high pressure hydraulic fluid provided to second low speed axel drive motor 226A and/or second high-speed axel drive motor 226B used to power second drive axel 228, unbalanced drive forces are exerted on first drive axel 227 and second drive axel 228. As a result, first drive axel on-rail components 291/293 and second drive axel on-rail components 292/294 are either dragging or pushing with respect to each other.

To prevent this from occurring, the disclosed high rail drive system 200 includes compensator unit 222. In one embodiment, compensator unit 222 is a limited slip valve compensator unit.

As seen in FIG. 2A, in one embodiment, compensator unit 222 is implemented between high pressure hydraulic fluid line 235 and return hydraulic fluid line 255 that connect first diverter unit 213 and first counterbalance unit 223 and high pressure hydraulic fluid line 236 and return hydraulic fluid line 256 that connect second diverter unit 214 and second counterbalance unit 224.

As also seen in FIG. 2A, in one embodiment, high pressure hydraulic fluid line 235 is hydraulically coupled to compensator unit 222 by way of equalization hydraulic line 273 and return hydraulic fluid line 255 is hydraulically coupled to compensator unit 222 by way of equalization hydraulic line 271.

Similarly, in one embodiment, high pressure hydraulic fluid line 236 is hydraulically coupled to compensator unit 222 by way of equalization hydraulic line 274 and return hydraulic fluid line 255 is hydraulically coupled to compensator unit 222 by way of equalization hydraulic line 272.

In one embodiment, compensator unit 222 uses limited slip valves to hydraulically couple and mechanically compare hydraulic pressure in high pressure hydraulic fluid line 235 and high pressure hydraulic fluid line 236. Similarly, in one embodiment, compensator unit 222 uses limited slip valves to hydraulically couple and mechanically compare hydraulic pressure in return hydraulic fluid line 255 and return hydraulic fluid line 256.

In one embodiment, when a threshold differential is detected between the hydraulic pressure in high pressure hydraulic fluid line 235 and high pressure hydraulic fluid line 236 and/or return hydraulic fluid line 255 and return hydraulic fluid line 256, compensator unit 222 allows hydraulic fluid pressure on these hydraulic fluid lines to be equalized by using valves to allow hydraulic fluid to flow from the hydraulic lines of one wheel drive axel motor to the hydraulic lines of the other wheel drive axel motor until the hydraulic pressure on the hydraulic lines of the wheel drive axel motors is equalized to below threshold differential value.

In this way, compensator unit 222 provides for true four wheel drive by ensuring balanced hydraulic pressure on the high pressure hydraulic fluid line 235 and high pressure hydraulic fluid line 236 of the wheel drive axel motors 225A/225B and 226A/226B. This, in turn, provides for relatively equal drive forces on the first drive axel on-rail components 291/293 and second drive axel on-rail components 292/294.

As a result, the on-rail components 291/293 and 292/294, in this example rail wheels, are neither dragging nor pushing with respect to each other. This minimizes the inefficiency and uneven wear and tear on the rail wheel drive axel motors 225A/225B and 226A/226B, rail wheel axels 227/228, and the on-rail components 291/293 and 292/294, e.g., rail wheels, that is associated with unequal hydraulic fluid pressure being provided to rail wheel drive axel motors 225A/225B and 226A/226B.

Those of skill in the art will recognize that compensator unit 222 can be any one or more of numerous types of compensator units known in the art. Consequently, a more detailed discussion of any particular type of compensator unit 222 is omitted here to avoid detracting from the invention.

Figure 2B:
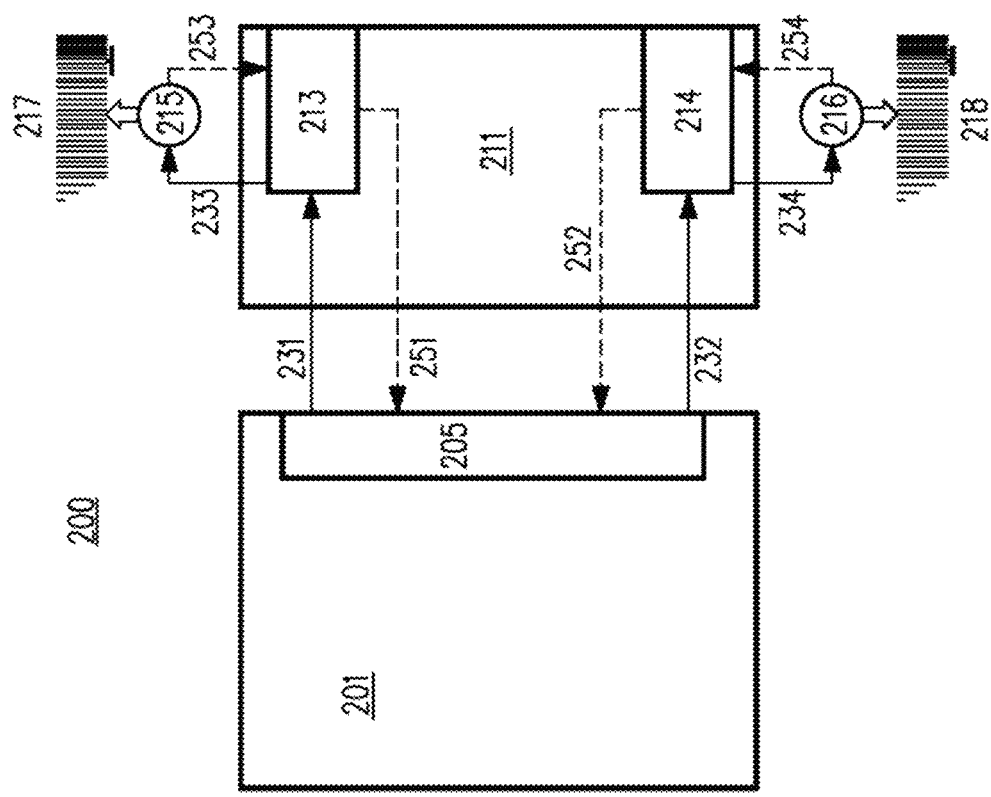
FIG. 2B is a block diagram and high level schematic drawing of one embodiment of the disclosed high rail drive system of FIG. 2A showing various components, hydraulic lines, and hydraulic fluid flow in the off-rail operating mode.

FIG. 2B is a block diagram high level schematic drawing of one embodiment of the disclosed rail wheel drive system for high rail drive systems of FIG. 2A showing various components, hydraulic lines, and hydraulic fluid flow in the cat drive/off-rail operating mode.

As discussed above, in one embodiment, the hydraulic fluid is supplied to the various components of high rail drive system 200 using one or more hydraulic motors (not shown in FIG. 2B). In one embodiment, hydraulic fluid is supplied from fluid reservoir 205, and pressurized by the one or more hydraulic motors (not shown in FIG. 2B).

As discussed in more detail below, the high pressure hydraulic fluid is then used to hydraulically couple the various components of high rail drive system 200 by way of high pressure hydraulic lines (shown as solid lines in FIG. 2B). Then the high pressure hydraulic fluid performs the desired functions and, in the process is transformed into low pressure hydraulic fluid. The low pressure hydraulic fluid is then returned to fluid reservoir 205 by way of return hydraulic fluid lines (shown as dashed lines in FIG. 2B).

In one embodiment, high pressure hydraulic fluid line 231 is used to hydraulically couple fluid reservoir 205 to first diverter unit 213 of off-rail drive sub-system 211. Similarly, in one embodiment, high pressure hydraulic fluid line 232 is used to hydraulically couple fluid reservoir 205 to second diverter unit 214 of off-rail drive sub-system 211.

In one embodiment, in off-rail operation, first diverter unit 213 uses high pressure hydraulic fluid line 233 to divert the high pressure hydraulic fluid from high pressure hydraulic fluid line 231 to off-rail drive component drive motor 215 which uses the high pressure hydraulic fluid to power first off-rail drive component 217, in this example a cat track.

In one embodiment, in off-rail operation, the resulting low pressure hydraulic fluid is then returned to first diverter unit 213 by return hydraulic fluid line 253.

In one embodiment, in off-rail operation, first diverter unit 213 then returns the low pressure hydraulic fluid to fluid reservoir 205 by way of return hydraulic fluid line 251 for re-pressurization to high pressure hydraulic fluid.

Similarly, in one embodiment, in off-rail operation, second diverter unit 214 uses high pressure hydraulic fluid line 234 to divert the high pressure hydraulic fluid from high pressure hydraulic fluid line 232 to off-rail drive component drive motor 216 which uses the high pressure hydraulic fluid to power second off-rail drive component 218, in this example a cat track.

In one embodiment, in off-rail operation, the resulting low pressure hydraulic fluid is then returned to second diverter unit 214 by return hydraulic fluid line 254. In one embodiment, in off-rail operation, second diverter unit 214 then returns the low pressure hydraulic fluid to fluid reservoir 205 by way of return hydraulic fluid line 252 for re-pressurization to high pressure hydraulic fluid.

In this way, in off-rail operation, off-rail drive components 217 and 218 are powered and controlled. As noted, in the specific illustrative example of FIGS. 2A, 2B, and 2C, the off-rail drive components 217 and 218 are cat tracks. However, in other embodiments, off-rail drive components 217 and 218 can be wheels, tires, or any other off-rail drive components capable of hydraulic operation, as discussed herein, and/or as known/available in the art at the time of filing, and/or as made known/available after the time of filing.

In some embodiments, the disclosed rail wheel drive system can be implemented independently of a high rail drive system as simply an improved hydraulic drive system. Consequently, embodiments of the disclosed method and system are stand-alone improved hydraulic drive systems that are independent and/or do not include an off-rail drive system.

To this end, in one embodiment of the disclosed methods and systems is a hydraulic drive system that includes at least one hydraulic fluid pump for providing high pressure hydraulic fluid, the at least one hydraulic fluid pump being operatively coupled to the fluid reservoir.

One embodiment of the disclosed hydraulic drive system includes a first drive axel.

One embodiment of the disclosed hydraulic drive system includes at least one first axel drive motor, the at least one first axel drive motor being operatively coupled to the first drive axel such that when high pressure hydraulic fluid enters the at least one first axel drive motor, the hydraulic fluid passes through the at least one first axel drive motor to power the first drive axel, the hydraulic fluid then exiting the at least one first axel drive motor as low pressure hydraulic fluid.

One embodiment of the disclosed hydraulic drive system includes a second drive axel.

One embodiment of the disclosed hydraulic drive system includes at least one second axel drive motor, the at least one second axel drive motor being operatively coupled to the second drive axel such that when high pressure hydraulic fluid enters the at least one second axel drive motor, the hydraulic fluid passes through the at least one second axel drive motor to power the second drive axel, the hydraulic fluid then exiting the at least one second axel drive motor as low pressure hydraulic fluid.

One embodiment of the disclosed hydraulic drive system includes a first counterbalance unit, the first counterbalance unit receiving high pressure hydraulic fluid from the at least one hydraulic fluid pump.

In accordance with one embodiment of the disclosed hydraulic drive system, the first counterbalance unit being hydraulically coupled to the at least one first axel drive motor to provide the high pressure hydraulic fluid to the at least one first axel drive motor.

In accordance with one embodiment of the disclosed hydraulic drive system, the first counterbalance unit is hydraulically coupled to the at least one first axel drive motor so that the low pressure hydraulic fluid exiting the at least one first axel drive motor is passed through the first counterbalance unit to the fluid reservoir wherein.

In accordance with one embodiment of the disclosed hydraulic drive system, the first counterbalance unit when high pressure hydraulic fluid is not being supplied to the at least one first axel drive motor, the first counterbalance unit restricts the flow of hydraulic fluid exiting the at least one first axel drive motor back to the fluid reservoir to provide dynamic braking to the at least one first axel drive motor when the at least one first axel drive motor is in an unpowered state;

One embodiment of the disclosed hydraulic drive system includes a second counterbalance unit, the second counterbalance unit receiving high pressure hydraulic fluid from the at least one hydraulic fluid pump.

In accordance with one embodiment of the disclosed hydraulic drive system, the second counterbalance unit is hydraulically coupled to the at least one second axel drive motor to provide the high pressure hydraulic fluid to the at least one second axel drive motor.

In accordance with one embodiment of the disclosed hydraulic drive system, the second counterbalance unit is hydraulically coupled to the at least one second axel drive motor such that the low pressure hydraulic fluid exiting the at least one second axel drive motor is passed through the second counterbalance unit to the fluid reservoir.

In accordance with one embodiment of the disclosed hydraulic drive system, when high pressure hydraulic fluid is not being supplied to the at least one second axel drive motor, the second counterbalance unit restricts the flow of hydraulic fluid exiting the at least one second axel drive motor back to the fluid reservoir to provide dynamic braking to the at least one second axel drive motor when the at least one second axel drive motor is in an unpowered state.

One embodiment of the disclosed hydraulic drive system includes a compensator unit.

In accordance with one embodiment of the disclosed hydraulic drive system, the compensator unit is hydraulically coupled to both the high pressure hydraulic fluid and the low pressure hydraulic fluid of the at least one first axel drive motor and the high pressure hydraulic fluid and the low pressure hydraulic fluid of the at least one second axel drive motor such that the compensator unit allows high pressure hydraulic fluid and low pressure hydraulic fluid to pass between the at least one first axel drive motor and the at least one second axel drive motor so that the pressure of the high pressure hydraulic fluid pressure and the pressure of the low pressure hydraulic fluid can be equalized between the at least one first axel drive motor and the at least one second axel drive motor.

One embodiment of the disclosed hydraulic drive system includes a cavitation prevention pump.

In accordance with one embodiment of the disclosed hydraulic drive system, the cavitation prevention pump is operatively coupled to fluid reservoir.

In accordance with one embodiment of the disclosed hydraulic drive system, the cavitation prevention pump is operatively coupled to the at least one first axel drive motor such that the cavitation prevention pump provides hydraulic fluid to the at least one first axel drive motor to prevent the at least one first axel drive motor from cavitating when no high pressure hydraulic fluid is provided to the at least one first axel drive motor.

In accordance with one embodiment of the disclosed hydraulic drive system, the cavitation prevention pump is operatively coupled to the at least one second axel drive motor such that the cavitation prevention pump provides hydraulic fluid to the at least one second axel drive motor to prevent the at least one second axel drive motor from cavitating when no high pressure hydraulic fluid is provided to the at least one second axel drive motor.

In accordance with one embodiment of the disclosed hydraulic drive system, at least one first drive axel on-rail component is operative coupled to the first drive axel and at least one second drive axel on-rail component is operatively coupled to the second drive axel.

In accordance with one embodiment of the disclosed hydraulic drive system, the at least one first drive axel on-rail component and the at least one second drive axel on-rail component are rail wheels.

In accordance with one embodiment of the disclosed hydraulic drive system, at least one of the first axel drive motor and the first drive axel and the second axel drive motor and the second drive axel are configured as single shaft through motor rail wheel drive axials.

In accordance with one embodiment of the disclosed hydraulic drive system, at least one of the first axel drive motor of the at least one single shaft through motor rail wheel drive axial further is a two-speed four port motor, the two-speed four port motor including a low speed motor and a high-speed motor housed in a single two-speed four port motor housing and a low-to-high-speed/high-to-low two speed shifting unit.

In accordance with one embodiment of the disclosed hydraulic drive system, the compensator unit is a limited slip valve compensator unit.

Figure 2C:
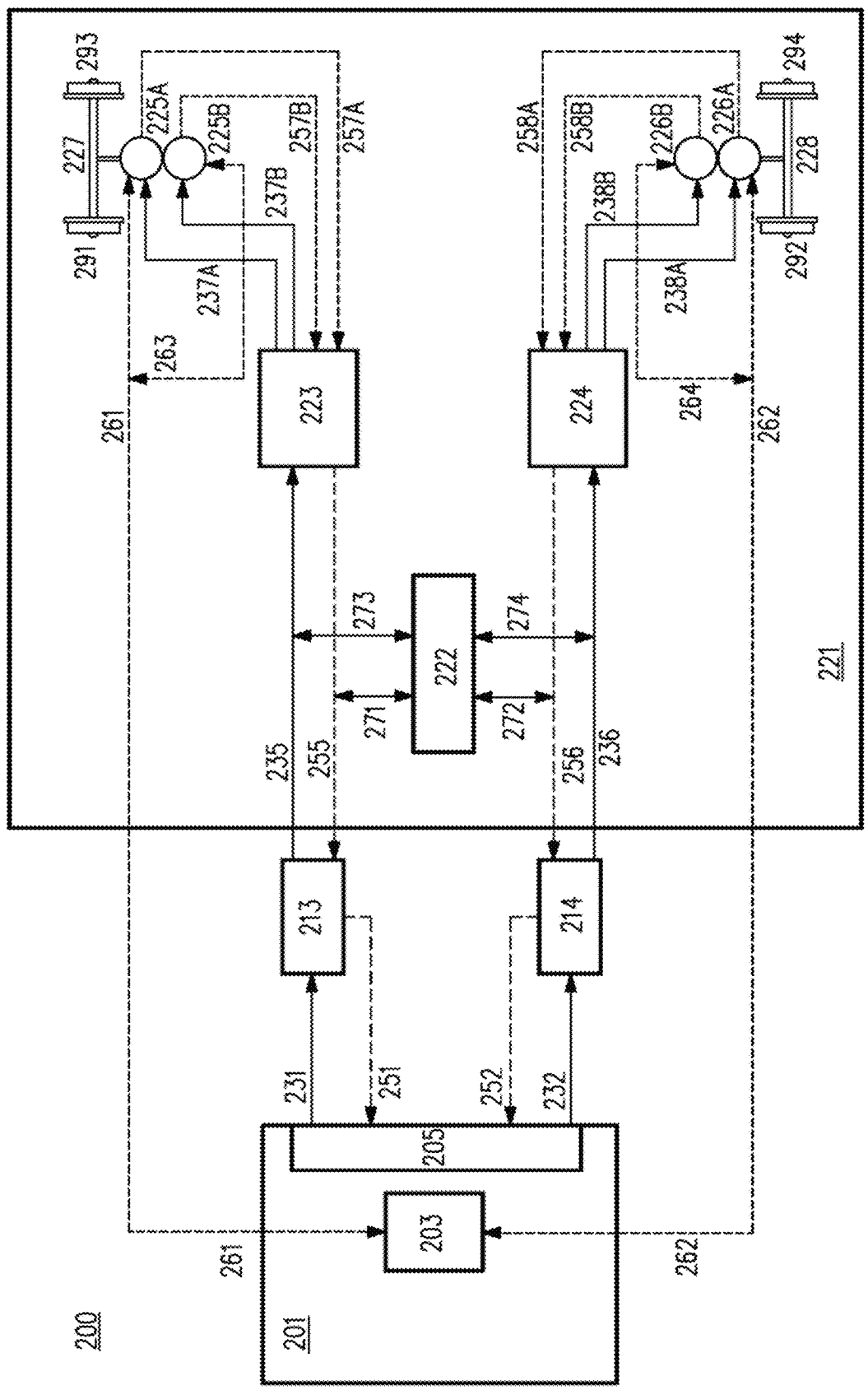
FIG. 2C shows the block diagram and high level schematic drawing of one embodiment of the disclosed rail drive system in the on-rail mode, or a disclosed standalone hydraulic system, showing various components, hydraulic lines, and hydraulic fluid flow.

FIG. 2C shows the block diagram and high level schematic drawing of one embodiment of the disclosed rail drive system in the on-rail mode, or a disclosed standalone hydraulic system, showing various components, hydraulic lines, and hydraulic fluid flow.

In one embodiment, in on-rail operation of the disclosed rail drive system, first diverter unit 213 is used to divert the high pressure hydraulic fluid from high pressure hydraulic fluid line 231 to on-rail drive sub-system 221 and first counterbalance unit 223 by way of high pressure hydraulic fluid line 235.

Similarly, in one embodiment, in on-rail operation, second diverter unit 214 is used to divert the high pressure hydraulic fluid from high pressure hydraulic fluid line 232 to on-rail drive sub-system 221 and second counterbalance unit 224 by way of high pressure hydraulic fluid line 236.

In one embodiment of the disclosed rail drive system in the on-rail mode, or the disclosed standalone hydraulic system, first and second counterbalance units 223/224 are used to prevent the high pressure back flow issues of prior art systems discussed above. In one embodiment, first and second counterbalance units 223/224 restrict the flow of hydraulic fluid from the rail wheel drive axel motors 225A. 225B, 226A, and 226B along hydraulic fluid lines 237A, 237B, 257A, 257B. 238A, 238B, 258A, and 258B, 235, 255, 236, 256, 231, 251, 232, and 252 back to fluid reservoir 205 when high rail drive system 200 is in the neutral or coasting state.

In one embodiment, when the hydraulic fluid pressure on high pressure hydraulic lines 235, 236, 237A, 237B, 238A, and 238B to the rail wheel drive axel motors 225A. 225B, 226A, and 226B decreases below a threshold level, such as when the rail wheel drive axel motors 225A, 225B, 226A, and 226B are unpowered and on-rail components 291, 293, 292, 294, in this example rail wheels, are coasting, first and second counterbalance units 223/224 sense this drop in pressure and provide dynamic braking in the hydraulic system similar to that of jake brakes in truck exhaust systems.

Consequently, using the disclosed embodiments, the pulling of hydraulic fluid from the hydraulic lines into the rail wheel drive axel motors and simultaneous pushing the hydraulic fluid back into the hydraulic system when the rail wheel drive axel motors are unpowered is minimized. As a result, the buildup of extreme back pressure in the hydraulic system of the disclosed high rail drive system 200 is avoided.

In one embodiment, in this unpowered/coasting state, cavitation prevention pump 203 provides supplementary hydraulic fluid to first low speed axel drive motor 225A, via supplemental hydraulic fluid line 261, first high-speed axel drive motor 225B, via supplemental hydraulic fluid line 263, second low speed axel drive motor 226A, via supplemental hydraulic fluid line 262, and second high-speed axel drive motor 226B, via supplemental hydraulic fluid line 264.

In this way, when the rail wheel drive axel motors 225A, 225B, 226A, and 226B are unpowered and on-rail components 291, 293, 292, 294, are coasting, or the hydraulic pressure to the rail wheel drive axel motors 225A. 225B, 226A, and 226B decreases for any reason, a constant small supply of hydraulic fluid is still provided to the rail wheel drive axel motors 225A, 225B, 226A, and 226B.

By providing this constant small supply of hydraulic fluid to the rail wheel drive axel motors 225A. 225B, 226A, and 226B, even when they are unpowered, enough hydraulic fluid is provided to prevent cavitation and the prevent the stress and damage to rail wheel drive axel motors 225A. 225B, 226A, and 226B that is associated with cavitation.

As seen in FIG. 2C, in one embodiment, first counterbalance unit 223 is implemented between high pressure hydraulic fluid line 235 and wheel drive axel motors 225A. 225B. In one embodiment, high pressure hydraulic fluid on high pressure hydraulic fluid line 235 is conveyed through first counterbalance unit 223 to first low speed axel drive motor 225A by way of high pressure hydraulic fluid line 237A. Similarly, in one embodiment, high pressure hydraulic fluid on high pressure hydraulic fluid line 235 is conveyed through first counterbalance unit 223 to first high-speed axel drive motor 225B by way of high pressure hydraulic fluid line 237B.

The high pressure hydraulic fluid conveyed to first low speed axel drive motor 225A and/or first high-speed axel drive motor 225B is then used to power first drive axel 227 and thereby cause first drive axel on-rail component 291 and first drive axel on-rail component 293, in this illustrative example, rail wheels, to rotate and propel the equipment, such as excavator 100 of FIG. 1A, along the railroad tracks.

Returning to FIG. 2C, once first low speed axel drive motor 225A and/or first high-speed axel drive motor 225B are used to power first drive axel 227 and the high pressure hydraulic fluid becomes low pressure hydraulic fluid, the low pressure hydraulic fluid is transferred back to fluid reservoir by way of low pressure hydraulic fluid lines 257A, 257B, 255, and 251.

Similarly, as seen in FIG. 2C, in one embodiment, second counterbalance unit 224 is implemented between high pressure hydraulic fluid line 236 and wheel drive axel motors 226A. 226B. In one embodiment, high pressure hydraulic fluid on high pressure hydraulic fluid line 236 is conveyed through second counterbalance unit 224 to second low speed axel drive motor 226A by way of high pressure hydraulic fluid line 238A. Similarly, in one embodiment, high pressure hydraulic fluid on high pressure hydraulic fluid line 236 is conveyed through second counterbalance unit 224 to second high-speed axel drive motor 226B by way of high pressure hydraulic fluid line 238B.

The high pressure hydraulic fluid conveyed to second low speed axel drive motor 226A and/or second high-speed axel drive motor 226B is then used to power second drive axel 228 and thereby cause second drive axel on-rail component 292 and second drive axel on-rail component 294, in this illustrative example, rail wheels, to rotate and propel the equipment, such as excavator 100 of FIG. 1A, along the railroad tracks.

Returning to FIG. 2C, once second low speed axel drive motor 226A and/or second high-speed axel drive motor 226B are used to power second drive axel 228 and the high pressure hydraulic fluid becomes low pressure hydraulic fluid, the low pressure hydraulic fluid is transferred back to fluid reservoir 205 by way of low pressure hydraulic fluid lines 258A, 258B, 256, and 252.

As noted above, if the pressure of the high pressure hydraulic fluid provided to first low speed axel drive motor 225A and/or first high-speed axel drive motor 225B used to power second drive axel 227 is significantly higher or lower than the pressure of the high pressure hydraulic fluid provided to second low speed axel drive motor 226A and/or second high-speed axel drive motor 226B used to power second drive axel 228, unbalanced drive forces are exerted on first drive axel 227 and second drive axel 228. As a result, first drive axel on-rail components 291/293 and second drive axel on-rail components 292/294 are either dragging or pushing with respect to each other.

To prevent this from occurring, the disclosed high rail drive system 200 includes compensator unit 222. In one embodiment, compensator unit 222 is a limited slip valve compensator unit.

As seen in FIG. 2C, in one embodiment, compensator unit 222 is implemented between high pressure hydraulic fluid line 235 and return hydraulic fluid line 255 that connect first diverter unit 213 and first counterbalance unit 223 and high pressure hydraulic fluid line 236 and return hydraulic fluid line 256 that connect second diverter unit 214 and second counterbalance unit 224.

As also seen in FIG. 2C, in one embodiment, high pressure hydraulic fluid line 235 is hydraulically coupled to compensator unit 222 by way of equalization hydraulic line 273 and return hydraulic fluid line 255 is hydraulically coupled to compensator unit 222 by way of equalization hydraulic line 271.

Similarly, in one embodiment, high pressure hydraulic fluid line 236 is hydraulically coupled to compensator unit 222 by way of equalization hydraulic line 274 and return hydraulic fluid line 255 is hydraulically coupled to compensator unit 222 by way of equalization hydraulic line 272.

In one embodiment, compensator unit 222 uses limited slip valves to mechanically compare hydraulic pressure in high pressure hydraulic fluid line 235 and high pressure hydraulic fluid line 236. Similarly, in one embodiment, compensator unit 222 uses limited slip valves to mechanically compare hydraulic pressure in return hydraulic fluid line 255 and return hydraulic fluid line 256.

In one embodiment, when a threshold differential is detected between the hydraulic pressure in high pressure hydraulic fluid line 235 and high pressure hydraulic fluid line 236 and/or return hydraulic fluid line 255 and return hydraulic fluid line 256, compensator unit 222 allows hydraulic fluid pressure on these hydraulic fluid lines to be equalized by allowing hydraulic fluid to flow from the hydraulic lines of one wheel drive axel motor to the hydraulic lines of the another wheel drive axel motor until the hydraulic pressure on the hydraulic lines of the wheel drive axel motors is equalized to below threshold differential value.

In this way, compensator unit 222 provides for true four wheel drive by ensuring balanced hydraulic pressure on the high pressure hydraulic fluid line 235 and high pressure hydraulic fluid line 236 of the wheel drive axel motors 225A/225B and 226A/226B. This, in turn, provides for relatively equal drive forces on the first drive axel on-rail components 291/293 and second drive axel on-rail components 292/294.

As a result, the on-rail components 291/293 and 292/294, in this example rail wheels, are neither dragging nor pushing with respect to each other. This minimizes the inefficiency and uneven wear and tear on the rail wheel drive axel motors 225A/225B and 226A/226B, rail wheel axels 227/228, and the on-rail components 291/293 and 292/294, e.g., rail wheels, that is associated with unequal hydraulic fluid pressure being provided to rail wheel drive axel motors 225A/225B and 226A/226B.

As shown above using FIG. 2C, in some embodiments, the disclosed rail wheel drive system can be implemented independently of a high rail drive system as simply an improved hydraulic drive system. Consequently, embodiments of the disclosed method and system are stand-alone improved on-rail wheel drive systems that are independent and/or do not include an off-rail drive system.

As discussed above, the disclosed high rail drive system 200 provides a technical solution to the long-standing technical problem of providing high rail drive systems that do not suffer from the prior art back pressure issues, cavitation issues, uneven drive issues, and rail axel drive motor issues, and therefore are reliable, cost effective, and efficient.

Those of skill in the art will recognize that the embodiments of FIGS. 2A, 2B, and 2C are but illustrative examples of the concepts claimed herein. Consequently, there are numerous components and connections that can be implemented to the claimed features associated with the disclosed methods and systems. However, FIG. 3 provides a more detailed specific example of one illustrative example of one embodiment of the invention.

Figure 3:
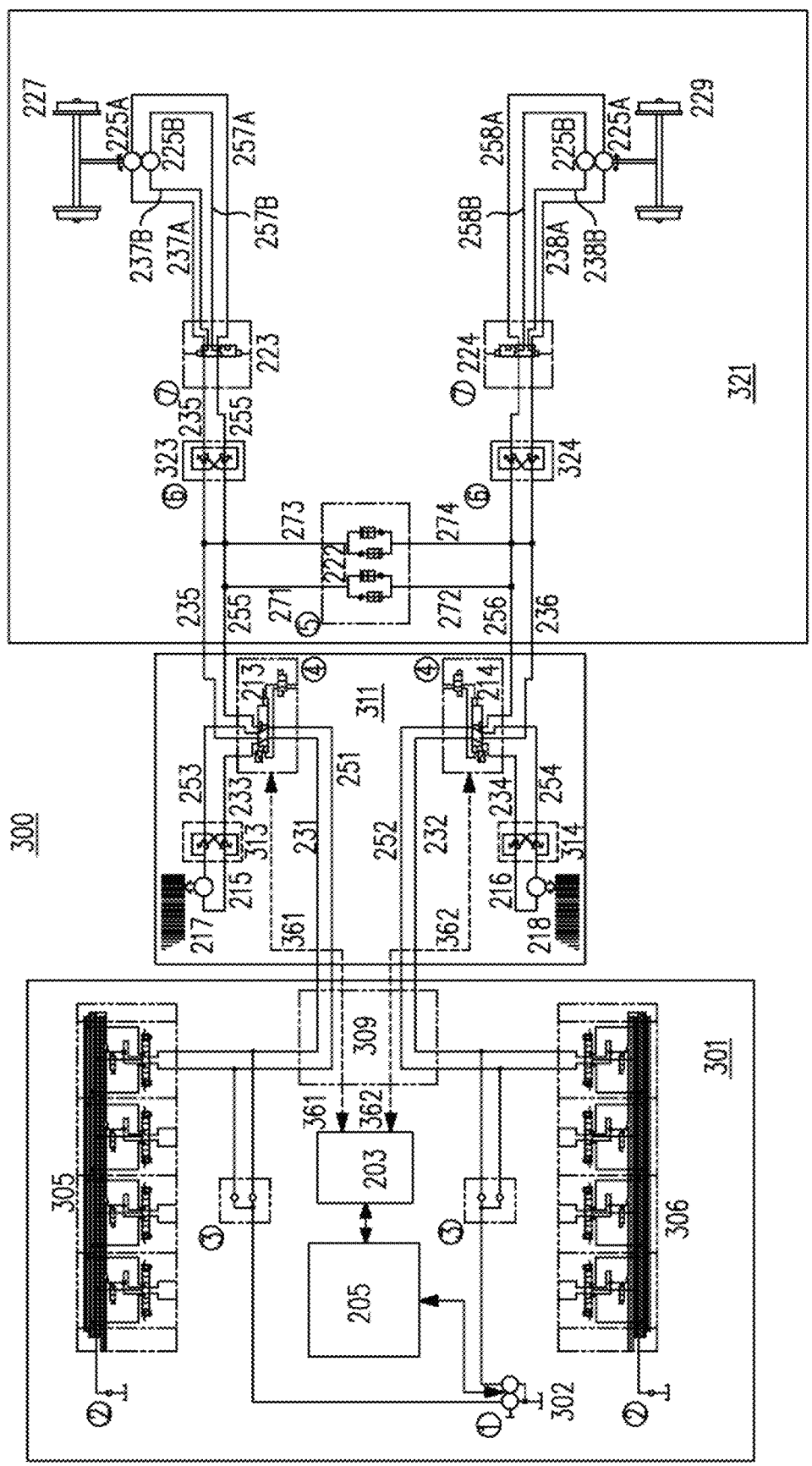
FIG. 3 is a more detailed block diagram and schematic drawing of one embodiment of the disclosed high rail drive system showing various illustrative components and hydraulic line plumbing for one illustrative example of one embodiment.

In particular, FIG. 3 is a more detailed schematic drawing of one embodiment of a disclosed high rail drive system 300 showing various specific components and hydraulic connections. In addition, FIGS. 4A, 4B, 5, 6, 7, 8A, 8B, 8C, 9A, 9B, 9C, 9D, 9E, and 9F show specific illustrative examples of specific components that can be used with one illustrative embodiment of the methods and systems disclosed herein.

FIG. 3 is a block diagram high level schematic drawing of one embodiment of the disclosed improved high rail drive system 300 showing various components and hydraulic line plumbing.

As seen in FIG. 3, improved high rail drive system 300 includes equipment-based hydraulic supply sub-system 301, off-rail drive sub-system 311, and on-rail drive sub-system 321.

In one embodiment, equipment-based hydraulic supply sub-system 301 is part of a piece of heavy equipment (not shown), such as an excavator, such excavator 100 of FIG. 1A, a bull dozer, a crane, or any other piece of hydraulically driven equipment as discussed herein, and/or as known/available in the art at the time of filing, and/or as made known/available after the time of filing.

Returning to FIG. 3, in one embodiment, all movement and functions of a piece of hydraulic equipment are accomplished through the use of hydraulic fluid via use of hydraulic cylinders, main hydraulic fluid pump 302, first valve system 305, and second valve system 306. In one embodiment, the piece of hydraulic equipment is attached to the disclosed high rail drive system 300 by way of a swivel bearing 309.

In one embodiment, the hydraulic fluid is supplied to the various components of high rail drive system 300 using the one or more hydraulic motors 302. In one embodiment, hydraulic fluid is supplied from fluid reservoir 205 and pressurized by the one or more hydraulic motors, e.g., main hydraulic fluid pump 302.

As discussed in more detail below, the high pressure hydraulic fluid is then used to hydraulically couple the various components of high rail drive system 300 by way of high pressure hydraulic lines. Then the high pressure hydraulic fluid performs the desired functions and, in the process, is transformed into low pressure hydraulic fluid. The low pressure hydraulic fluid is then returned to fluid reservoir 205 by way of return hydraulic fluid lines.

Also shown in FIG. 3 is cavitation prevention pump 203. In this embodiment, cavitation prevention pump 203 provides supplementary hydraulic fluid to first diverter unit 213 via supplemental hydraulic fluid line 361. The supplementary hydraulic fluid is then provided to first low speed axel drive motor 225A via high pressure hydraulic fluid line 235 and high pressure hydraulic fluid line 237A and to first high-speed axel drive motor 225B, via high pressure hydraulic fluid line 235 and high pressure hydraulic fluid line 237B.

Similarly, cavitation prevention pump 203 provides supplementary hydraulic fluid to second diverter unit 214 via supplemental hydraulic fluid line 362. The supplementary hydraulic fluid is then provided to second low speed axel drive motor 225A via high pressure hydraulic fluid line 236 and high pressure hydraulic fluid line 238A and to second high-speed axel drive motor 225B, via high pressure hydraulic fluid line 236 and high pressure hydraulic fluid line 238B.

In one embodiment, cavitation prevention pump 203 is used to provide a constant supply of hydraulic fluid to the rail wheel drive axel motors 225A, 225B, 226A, and 226B when on-rail components 291, 293, 292, and 294, in this example, rail wheels, are unpowered and coasting. This keeps hydraulic fluids in the rail wheel drive axel motors 225A, 225B, 226A, and 226B and thereby prevents cavitation.

Figure 4A:
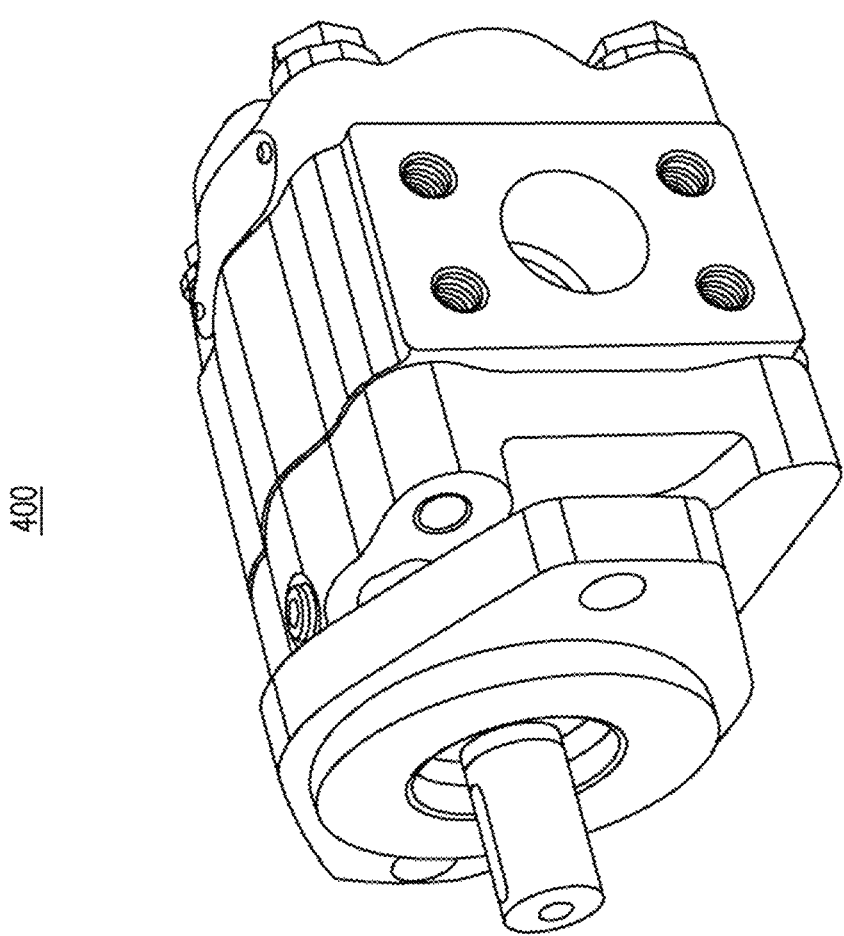
FIG. 4A shows one specific illustrative example of a cavitation prevention pump that can be used with one embodiment of the disclosed methods and systems.

FIG. 4A shows one specific illustrative example of a cavitation prevention pump 400 that can be used with one embodiment of the disclosed methods and systems as cavitation prevention pump 203.

Figure 4B:
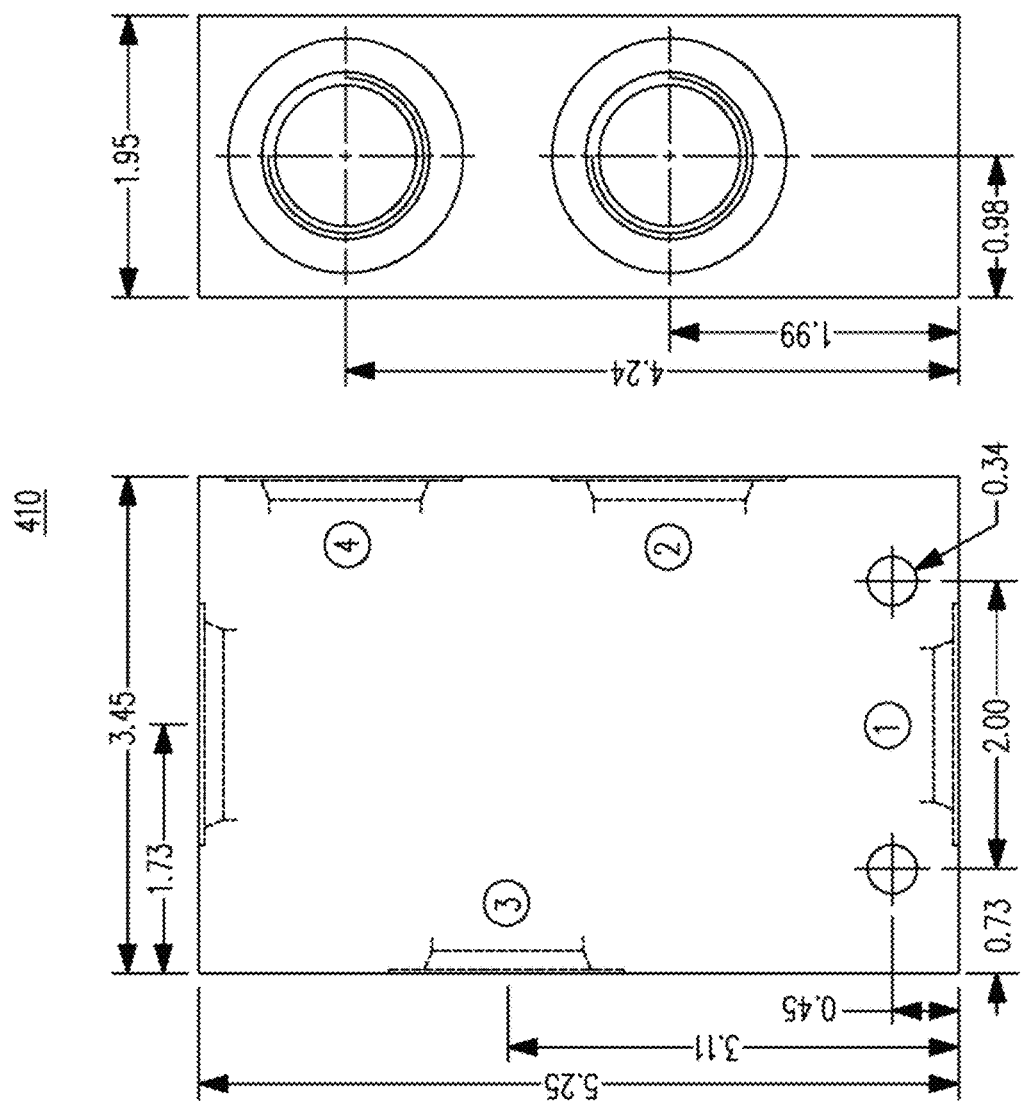
FIG. 4B is a schematic representation of one specific illustrative example of a flow control valve for use with a cavitation prevention pump that can be used with one embodiment of the disclosed methods and systems.

FIG. 4B is a schematic representation 410 of one specific illustrative example of a flow control valve for use with cavitation prevention pump 400 that can be used with one embodiment of the disclosed methods and systems as cavitation prevention pump 203.

Figure 9A:
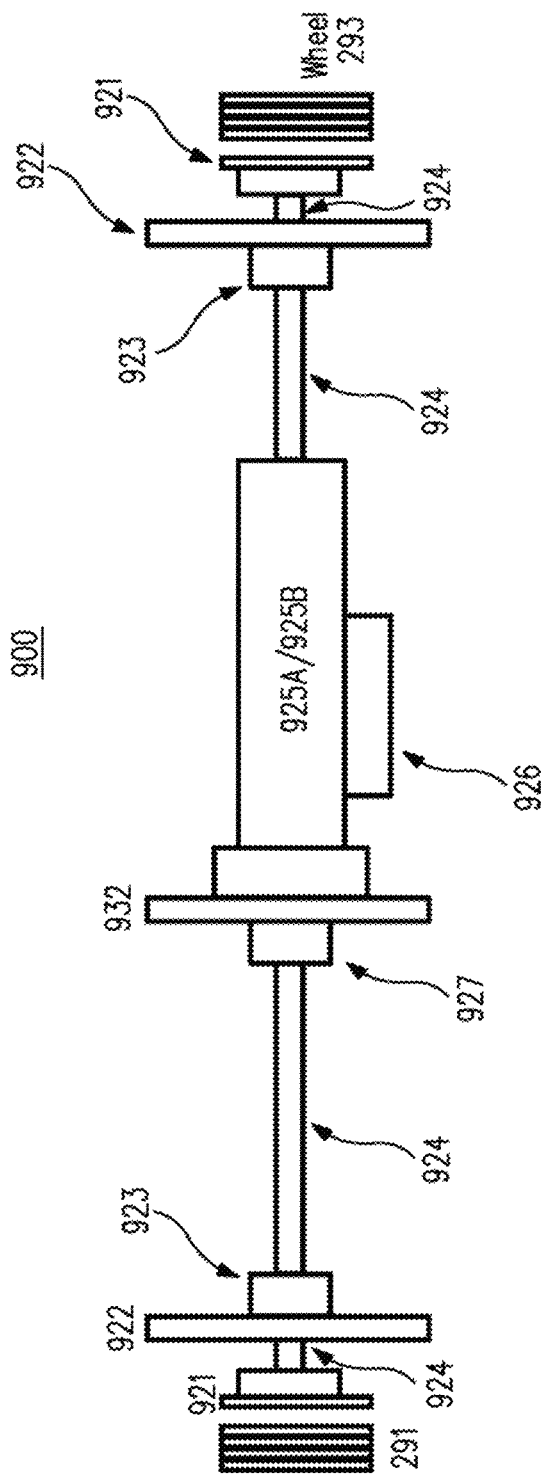
FIG. 9A is a block diagram drawing of one embodiment of a single shaft through motor rail wheel drive axial that can be used with one embodiment of the disclosed methods and systems.
Figure 9B:
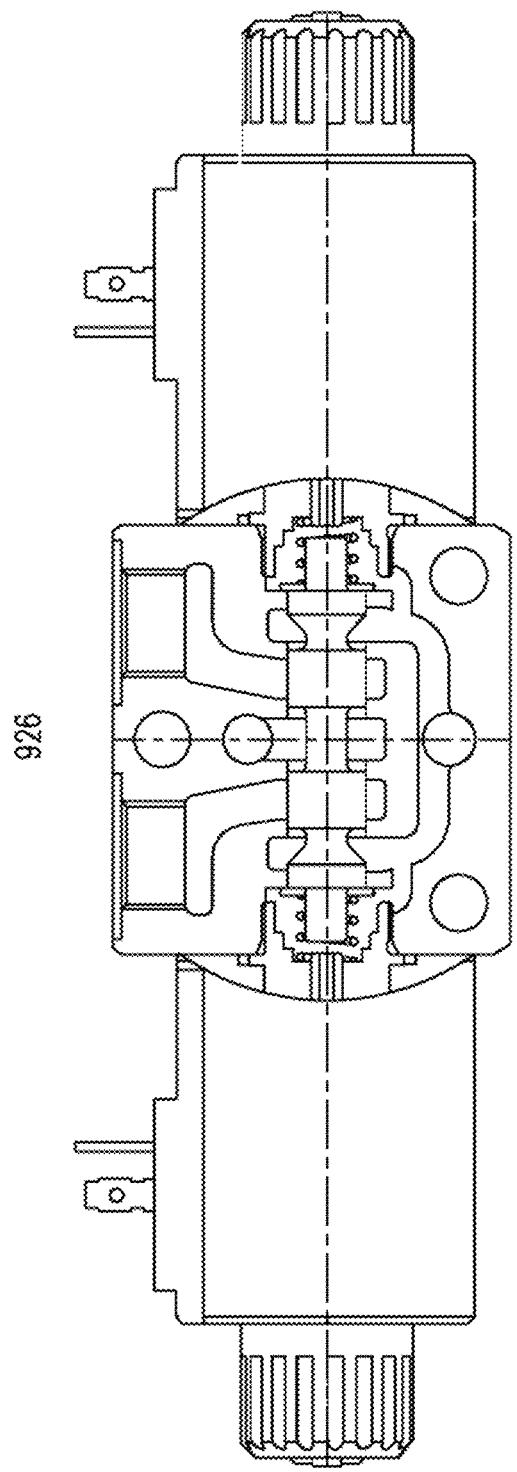
FIG. 9B is a line drawing of one embodiment of a two speed shifting unit that can be used with one embodiment of the disclosed methods and systems.
Figure 9C:
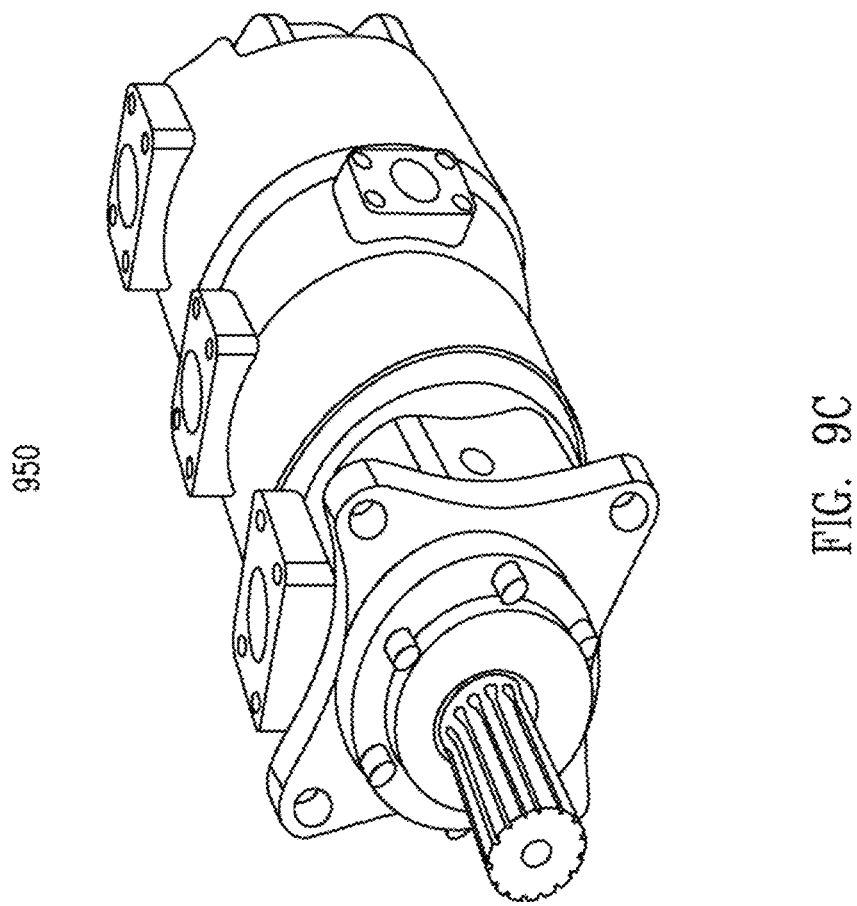
FIG. 9C shows one specific illustrative example of a four port drive motor that can be used with one embodiment of the disclosed methods and systems.

FIG. 9C shows one specific illustrative example of a four port drive motor 950 that can be used as rail wheel drive axel motors 225A, 225B, 226A, and 226B in one embodiment of the disclosed methods and systems.

Returning to FIG. 3, in various embodiments, rail wheel drive axel motors 225A, 225B can be housed and/or compartmented in the same motor housing, and rail wheel drive axel motors 226A, and 226B can be housed and/or compartmented in the same motor housing. When this is the case, a low-to-high-speed/high-to-low two speed shifting unit is needed to shift between first low speed rail wheel drive axel motor 225A and first high-speed rail wheel drive axel motor 225B. Similarly, a low-to-high-speed/high-to-low two speed shifting unit is also needed to shift between second low speed rail wheel drive axel motor 226A and first high-speed rail wheel drive axel motor 226B.

FIG. 9B is a line drawing of one embodiment of a two speed shifting unit 926 that can be used with one embodiment of the disclosed methods and systems.

Returning to FIG. 3, in one embodiment, high pressure hydraulic fluid line 231 is used to hydraulically couple fluid reservoir 205 to first diverter unit 213 of off-rail drive sub-system 311. Similarly, in one embodiment, high pressure hydraulic fluid line 232 is used to hydraulically couple fluid reservoir 205 to second diverter unit 214 of off-rail drive sub-system 311.

In one embodiment, in off-rail operation, first diverter unit 213 is used to divert the high pressure hydraulic fluid from high pressure hydraulic fluid line 231 to off-rail drive component drive motor 215 via high pressure hydraulic fluid line 233. Off-rail drive component drive motor 215 then uses the high pressure hydraulic fluid to power first off-rail drive component 217, in this example a cat track.

In one embodiment, in off-rail operation, the resulting low pressure hydraulic fluid is then returned to first diverter unit 213 by return hydraulic fluid line 253.

In one embodiment, in off-rail operation, first diverter unit 213 then returns the low pressure hydraulic fluid to fluid reservoir 205 by way of return hydraulic fluid line 251.

Similarly, in one embodiment, in off-rail operation, second diverter unit 214 is used to divert the high pressure hydraulic fluid from high pressure hydraulic fluid line 232 to off-rail drive component drive motor 216 using high pressure hydraulic fluid line 234. Off-rail drive component drive motor 216 then uses the high pressure hydraulic fluid to power second off-rail drive component 218, in this example a cat track.

In one embodiment, in off-rail operation, the resulting low pressure hydraulic fluid is then returned to second diverter unit 214 by return hydraulic fluid line 254. In one embodiment, in off-rail operation, second diverter unit 214 then returns the low pressure hydraulic fluid to fluid reservoir 205 by way of return hydraulic fluid line 252.

In this way, in off-rail operation, off-rail drive components 217 and 218 are powered and controlled. In the specific illustrative example of FIG. 3, the off-rail drive components 217 and 218 are cat tracks. However, in other embodiments, off-rail drive components 217 and 218 can be wheels, tires, or any other off-rail drive components capable of hydraulic operation, as discussed herein, and/or as known/available in the art at the time of filing, and/or as made known/available after the time of filing.

Also shown in FIG. 3 is first resolver component 313 and second resolver component 314. In one embodiment, first resolver component 313 is a check valve relief system that returns hydraulic fluid back to fluid reservoir 205 using return hydraulic fluid line 253 if the pressure on high pressure hydraulic fluid line 233 exceeds a threshold level. In one embodiment, second resolver component 314 is a check valve relief system that returns hydraulic fluid back to fluid reservoir 205 using return hydraulic fluid line 254 if the pressure on high pressure hydraulic fluid line 234 exceeds a threshold level.

Figure 5:
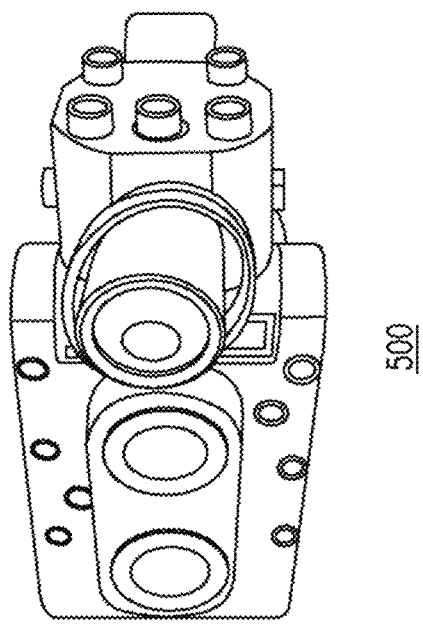
FIG. 5 shows one specific illustrative example of a diverter valve that can be used with one embodiment of the disclosed methods and systems.

FIG. 5 shows one specific illustrative example of a diverter valve 500 that can be used with one embodiment of the disclosed methods and systems as first diverter unit 213 and/or second diverter unit 214.

Those of skill in the art will recognize that diverters 213 and 214 can be any one or more of numerous types of diverters known in the art. Consequently, a more detailed discussion of any particular type of diverters 213 and 214 is omitted here to avoid detracting from the invention.

Figure 6:
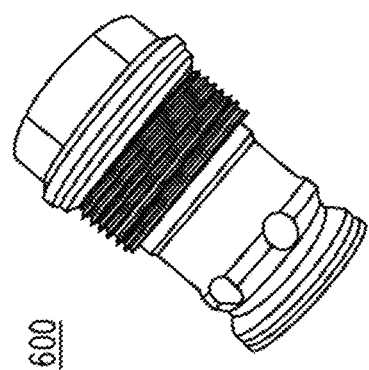
FIG. 6 shows one specific illustrative example of a check valve that can be used with one embodiment of the disclosed methods and systems.

FIG. 6 shows one specific illustrative example of a check valve 600 that can be used with one embodiment of the disclosed methods and systems as first resolver component 313 and second resolver component 314.

Those of skill in the art will recognize that resolver components 313, 314, 323, and 324 can be any one or more of resolver components known in the art. Consequently, a more detailed discussion of any particular type of resolver components 313, 314, 323, and 324 is omitted here to avoid detracting from the invention.

In one embodiment, in on-rail operation, first diverter unit 213 is used to divert the high pressure hydraulic fluid from high pressure hydraulic fluid line 231 to on-rail drive sub-system 321 and first counterbalance unit 223 by way of high pressure hydraulic fluid line 235.

Similarly, in one embodiment, in on-rail operation, second diverter unit 214 is used to divert the high pressure hydraulic fluid from high pressure hydraulic fluid line 232 to on-rail drive sub-system 321 and second counterbalance unit 224 by way of high pressure hydraulic fluid line 236.

In one embodiment, first and second counterbalance units 223/224 are used to prevent the high pressure back flow issues of prior art systems discussed above. In one embodiment, first and second counterbalance units 223/224 restrict the flow of hydraulic fluid from the rail wheel drive axel motors 225A, 225B, 226A, and 226B along hydraulic fluid lines 237A, 237B, 257A, 257B, 226A, 226B, 258A, and 258B, 235, 255, 236, 256, 231, 251, 232, and 252 when high rail drive system 200 is in the neutral or coasting state.

In one embodiment, when the hydraulic fluid pressure on high pressure hydraulic lines 235, 236, 237A, 237B, 238A, and 238B to the rail wheel drive axel motors 225A, 225B, 226A, and 226B decreases below a threshold level, such as when the rail wheel drive axel motors 225A, 225B, 226A, and 226B are unpowered and on-rail components 291, 293, 292, 294, in this example rail wheels, are coasting, first and second counterbalance units 223/224 sense this drop in pressure and provide dynamic braking in the hydraulic system similar to that of jake brakes in truck exhaust systems.

Consequently, using the disclosed embodiments, the pulling of hydraulic fluid from the hydraulic lines into the rail wheel drive axel motors and simultaneous pushing the hydraulic fluid back into the hydraulic system when the rail wheel drive axel motors are unpowered is minimized. As a result, the buildup of extreme back pressure in the hydraulic system of the disclosed high rail drive system is avoided.

Figure 7:
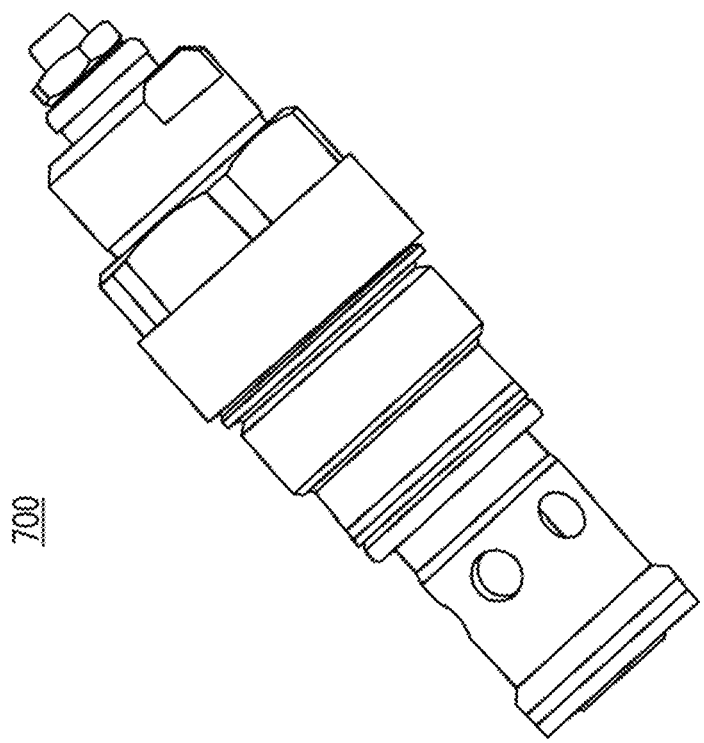
FIG. 7 is a drawing of one specific illustrative example of a counterbalance valve for use with the one embodiment of a counterbalance unit that can be used with one embodiment of the disclosed methods and systems.

FIG. 7 is a drawing of one specific illustrative example of a counterbalance valve 700 for use with the one embodiment of first counterbalance unit 223 and/or second counterbalance unit 224 in one embodiment of the disclosed methods and systems.

As seen in FIG. 3, in one embodiment, first counterbalance unit 223 is implemented between high pressure hydraulic fluid line 235 and wheel drive axel motors 225A, 225B. In one embodiment, high pressure hydraulic fluid on high pressure hydraulic fluid line 235 is conveyed through first counterbalance unit 223 to first low speed axel drive motor 225A by way of high pressure hydraulic fluid line 237A. Similarly, in one embodiment, high pressure hydraulic fluid on high pressure hydraulic fluid line 235 is conveyed through first counterbalance unit 223 to first high-speed axel drive motor 225B by way of high pressure hydraulic fluid line 237B.

The high pressure hydraulic fluid conveyed to first low speed axel drive motor 225A and/or first high-speed axel drive motor 225B is then used to power first drive axel 227 and thereby cause first drive axel on-rail component 291 and first drive axel on-rail component 293, in this illustrative example rail wheels, to rotate and propel the equipment, such as excavator 100 of FIG. 1A, along the railroad tracks.

Returning to FIG. 3, once first low speed axel drive motor 225A and/or first high-speed axel drive motor 225B are used to power first drive axel 227 and the high pressure hydraulic fluid becomes low pressure hydraulic fluid, the low pressure hydraulic fluid is transferred back to fluid reservoir 205 by way of low pressure hydraulic fluid lines 257A, 257B, 255, and 251.

Similarly, as seen in FIG. 3, in one embodiment, second counterbalance unit 224 is implemented between high pressure hydraulic fluid line 236 and wheel drive axel motors 226A, 226B. In one embodiment, high pressure hydraulic fluid on high pressure hydraulic fluid line 236 is conveyed through second counterbalance unit 224 to second low speed axel drive motor 226A by way of high pressure hydraulic fluid line 238A. Similarly, in one embodiment, high pressure hydraulic fluid on high pressure hydraulic fluid line 236 is conveyed through second counterbalance unit 224 to second high-speed axel drive motor 226B by way of high pressure hydraulic fluid line 238B.

The high pressure hydraulic fluid conveyed to second low speed axel drive motor 226A and/or second high-speed axel drive motor 226B is then used to power second drive axel 228 and thereby cause second drive axel on-rail component 292 and second drive axel on-rail component 294, in this illustrative example, rail wheels, to rotate and propel the equipment, such as excavator 100 of FIG. 1A, along the railroad tracks.

Returning to FIG. 3, once second low speed axel drive motor 226A and/or second high-speed axel drive motor 226B are used to power second drive axel 228 and the high pressure hydraulic fluid becomes low pressure hydraulic fluid, the low pressure hydraulic fluid is transferred back to fluid reservoir 205 by way of low pressure hydraulic fluid lines 258A, 258B, 256, and 252.

Also shown in FIG. 3 is third resolver component 323 and fourth resolver component 324. In one embodiment, third resolver component 323 is a check valve relief system that returns hydraulic fluid back to fluid reservoir 205 using return hydraulic fluid line 255 if the pressure on high pressure hydraulic fluid line 235 exceeds a threshold level. In one embodiment, fourth resolver component 324 is a check valve relief system that returns hydraulic fluid back to fluid reservoir 205 using return hydraulic fluid line 256 if the pressure on high pressure hydraulic fluid line 236 exceeds a threshold level.

As noted above, FIG. 6 shows one specific illustrative example of a check valve 600 that can be used with one embodiment of the disclosed methods and systems as first resolver component 313 and second resolver component 314.

As noted above, with respect to prior art systems, if the pressure of the high pressure hydraulic fluid provided to first low speed axel drive motor 225A and/or first high-speed axel drive motor 225B used to power second drive axel 227 is significantly higher or lower than the pressure of the high pressure hydraulic fluid provided to second low speed axel drive motor 226A and/or second high-speed axel drive motor 226B used to power second drive axel 228, unbalanced drive forces are exerted on first drive axel 227 and second drive axel 228. As a result, first drive axel on-rail components 291/293 and second drive axel on-rail components 292/294 are either dragging or pushing with respect to each other.

To prevent this from occurring, the disclosed high rail drive system 200 includes compensator unit 222. In one embodiment, compensator unit 222 is a limited slip valve compensator unit.

As seen in FIG. 3, in one embodiment, compensator unit 222 is implemented between high pressure hydraulic fluid line 235 and return hydraulic fluid line 255 that connect first diverter unit 213 and first counterbalance unit 223 and high pressure hydraulic fluid line 236 and return hydraulic fluid line 256 that connect second diverter unit 214 and second counterbalance unit 224.

As also seen in FIG. 3, in one embodiment, high pressure hydraulic fluid line 235 is hydraulically coupled to compensator unit 222 by way of equalization hydraulic line 273 and return hydraulic fluid line 255 is hydraulically coupled to compensator unit 222 by way of equalization hydraulic line 271.

Similarly, in one embodiment, high pressure hydraulic fluid line 236 is hydraulically coupled to compensator unit 222 by way of equalization hydraulic line 274 and return hydraulic fluid line 255 is hydraulically coupled to compensator unit 222 by way of equalization hydraulic line 272.

In one embodiment, compensator unit 222 uses limited slip valves to mechanically compare hydraulic pressure in high pressure hydraulic fluid line 235 and high pressure hydraulic fluid line 236. Similarly, in one embodiment, compensator unit 222 uses limited slip valves to mechanically compare hydraulic pressure in return hydraulic fluid line 255 and return hydraulic fluid line 256.

Figure 8A:
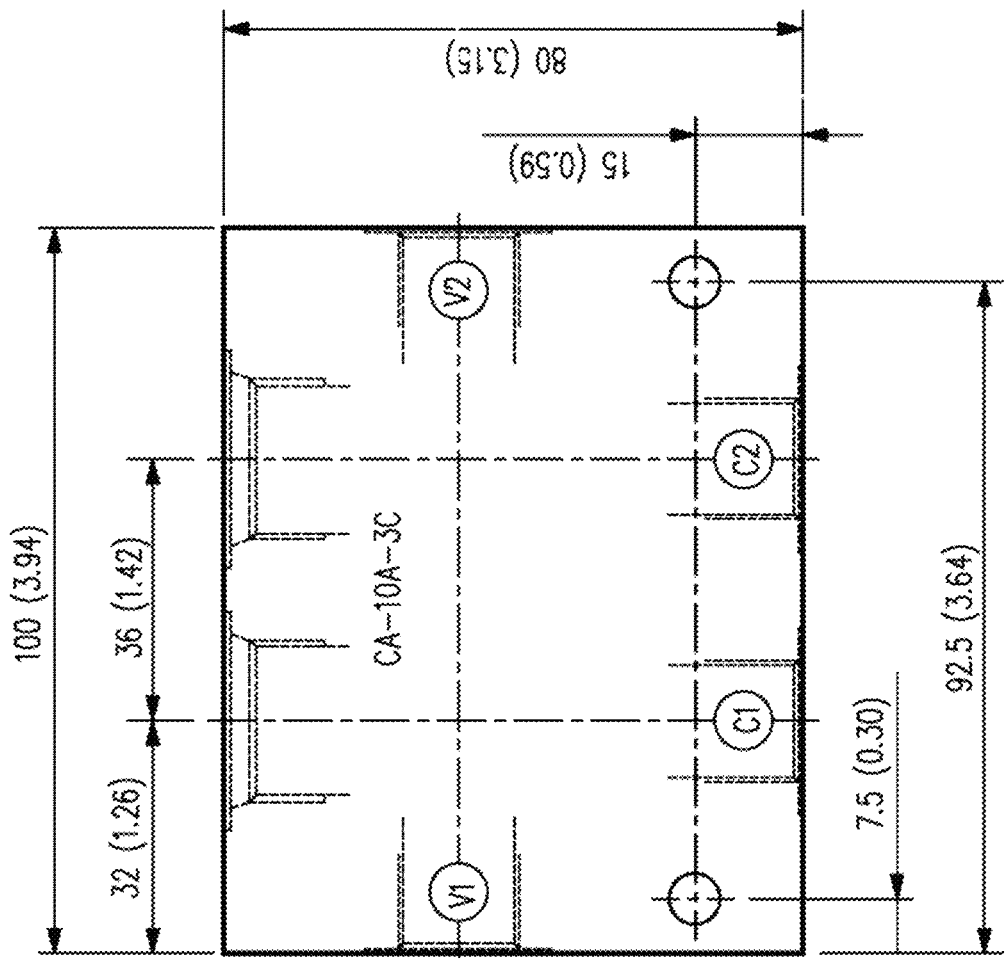
FIG. 8A is a schematic representation of one specific illustrative example of a limited slip valve compensator that can be used with one embodiment of the disclosed methods and systems.

FIG. 8A is a schematic representation 800 of one specific illustrative example of a limited slip valve compensator that can be used with one embodiment of the disclosed methods and systems.

Figure 8B:
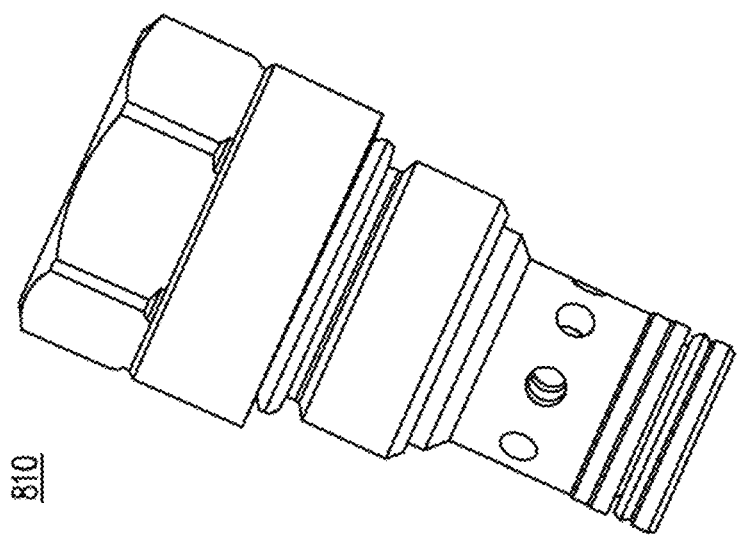
FIG. 8B is drawing of one specific illustrative example of a pressure compensated flow control valve that can be used with one embodiment of a limited slip valve compensator in accordance with one embodiment.

FIG. 8B is drawing of one specific illustrative example of a pressure compensated flow control valve 810 that can be used with one embodiment of a limited slip valve compensator in accordance with one embodiment.

Figure 8C:
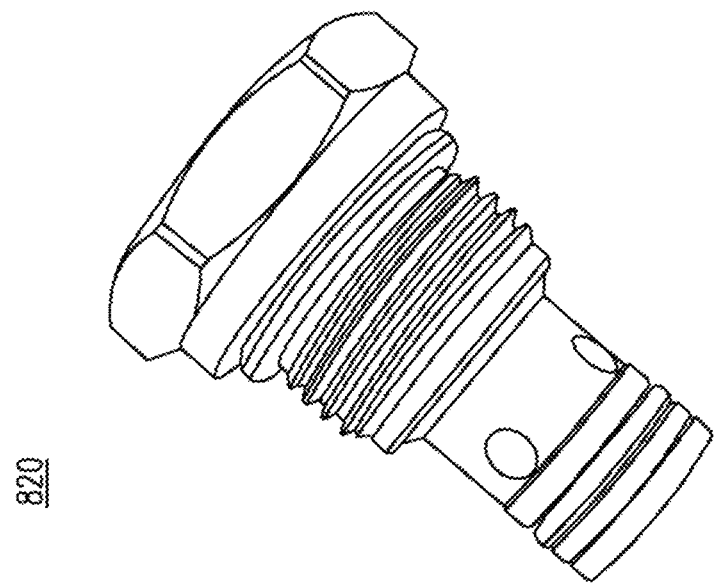
FIG. 8C is drawing of one specific illustrative example of a check valve that can be used with one embodiment of a limited slip valve compensator in accordance with one embodiment.

FIG. 8C is drawing of one specific illustrative example of a poppet check valve 820 that can be used with one embodiment of a limited slip valve compensator in accordance with one embodiment.

In one embodiment, when a threshold differential is detected between the hydraulic pressure in high pressure hydraulic fluid line 235 and high pressure hydraulic fluid line 236 and/or return hydraulic fluid line 255 and return hydraulic fluid line 256, compensator unit 222 allows hydraulic fluid pressure on these hydraulic fluid lines to be equalized by allowing hydraulic fluid to flow from the hydraulic lines of one wheel drive axel motor to the hydraulic lines of the another wheel drive axel motor until the hydraulic pressure on the hydraulic lines of the wheel drive axel motors is equalized to below threshold differential value.

In this way, compensator unit 222 provides for true four wheel drive by ensuring balanced hydraulic pressure on the high pressure hydraulic fluid line 235 and high pressure hydraulic fluid line 236 of the wheel drive axel motors 225A/225B and 226A/226B. This, in turn, provides for relatively equal drive forces on the first drive axel on-rail components 291/293 and second drive axel on-rail components 292/294.

As a result, the on-rail components 291/293 and 292/294, in this example rail wheels, are neither dragging nor pushing with respect to each other. This minimizes the inefficiency and uneven wear and tear on the rail wheel drive axel motors 225A/225B and 226A/226B, rail wheel axels 227/228, and the on-rail components 291/293 and 292/294, e.g., rail wheels, that is associated with unequal hydraulic fluid pressure being provided to rail wheel drive axel motors 225A/225B and 226A/226B.

As noted above, one of the issues with prior art high rail drive systems, such as prior art high rail drive system 120, is the prior art use of relatively small, and relatively weak, rail wheel drive axel motors. To counteract this use of small rail wheel drive axel motors, prior art high rail drive systems, such as prior art high rail drive system 120, must be connected to separate gearing systems in a broken, e.g., multiple drive shaft section, configuration to obtain the necessary power and torque needed to provide effective drive power to the rail wheel axel and the rail wheels.

This results in inefficiencies in several ways. First the weight of the system is increased by the addition of these significant gearing systems and drive shaft sections. Second, the gearing up of the small rail wheel drive axel motors puts unneeded stress on both the rail wheel drive axel motors and the entire drive system. In addition, the prior art gearing systems required by the use of small rail wheel drive axel motors with prior art high rail drive systems, such as prior art high rail drive system 120, means more moving parts to fail and/or be maintained. Again, this represents a significant inefficiency associated with prior art high rail drive systems, such as prior art high rail drive system 120.

To avoid these issues, in one embodiment, the disclosed methods and systems include an improved high rail drive system that utilizes relatively powerful four port rail wheel drive axel motors and single shaft through motor configurations. These powerful motor and single/through shaft configurations do not require extensive and complicated gearing systems to obtain the necessary power and torque needed to provide effective drive power to the rail wheel axel and the rail wheels.

FIG. 9A is a block diagram drawing of one embodiment of a single shaft through motor rail wheel drive axial 900 that can be used with one embodiment of the disclosed methods and systems as first drive axel 227 and/or second drive axel 228.

Referring to FIGS. 2A, 2B, 2C, 3, and 9A together, shown in FIG. 9A is low speed axel drive motor 925A/high-speed axel drive motor low speed drive 925B that can be used as first low speed axel drive motor 225A and first high-speed axel drive motor 225B and/or second low speed axel drive motor 226A and second high-speed axel drive motor 226B discussed above.

In FIG. 9A, rail wheel drive axel motors 925A/925B are housed and/or compartmented in the same motor housing. As noted above, when this is the case, a low-to-high-speed/high-to-low two speed shifting unit 926 is needed to shift between first low speed rail wheel drive axel motor 925A and first high-speed rail wheel drive axel motor 925B.

As noted above, FIG. 9B is a line drawing of one embodiment of a two speed shifting unit 926 that can be used with one embodiment of the disclosed methods and systems.

Also seen in FIG. 9A are first drive axel on-rail component 291 and first drive axel on-rail component 293, in this example rail wheels along with wheel adapter couplers 921 used to secure first drive axel on-rail component 291 and first drive axel on-rail component 293 to single through shaft 924.

Also shown in FIG. 9A are outer bulkheads 922 and inner bulkhead 932 along with inner bearings 923 and outer bearing 927.

Also shown in FIG. 9A is single through shaft 924 that, in one embodiment, extends from left to right as a single shaft from adapter coupler 921, that attaches first drive axel on-rail component 291 to single through shaft 924, through the first of bulkheads 922, through the first of inner bearings 923, through outer bearing 927, through inner bulkhead 932, through rail wheel drive axel motor 925A/925B, through the second of inner bearings 923, through the second of bulkheads 922, to adapter coupler 921, that attaches first drive axel on-rail component 293 to single through shaft 924.

As discussed above, the disclosed combination of power four port rail wheel drive axel motor 925A/925B and single through shaft 924 used in single shaft through motor rail wheel drive axial 900 eliminates the need for extensive and complicated gearing systems to obtain the necessary power and torque need to provide effective drive power. This, in turns, results in reduced weight of the disclosed high rail drive system, reduced stress on the rail wheel drive axel motors and the entire drive system, and fewer moving parts to fail and/or be maintained.

Figure 9D:
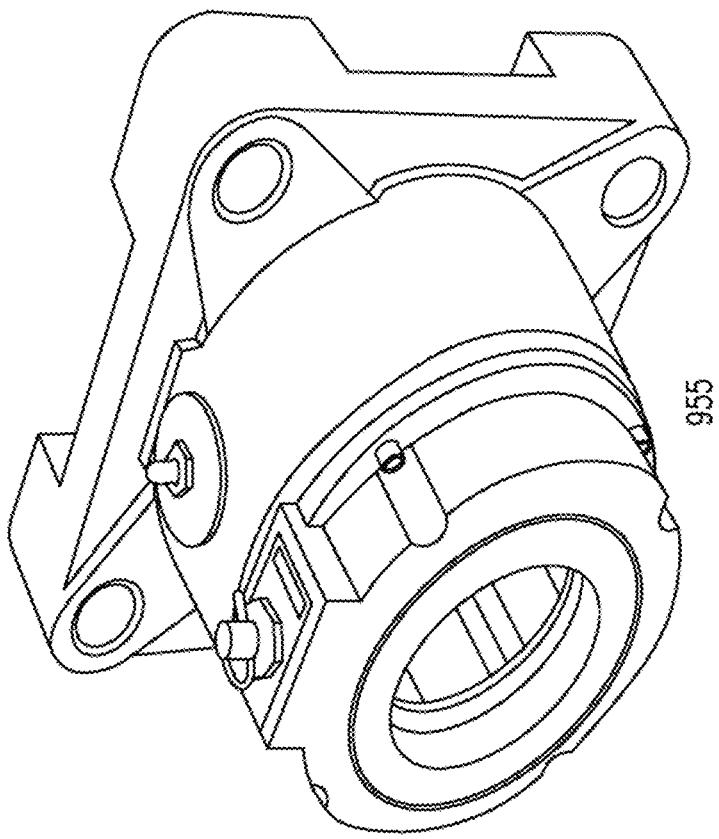
FIG. 9D shows one specific illustrative example of an axial bearing that can be used with one embodiment of the disclosed methods and systems.

FIG. 9D shows one specific illustrative example of an axial bearing 955 that can be used with one embodiment of the disclosed methods and systems as outer bearing 927.

Figure 9E:
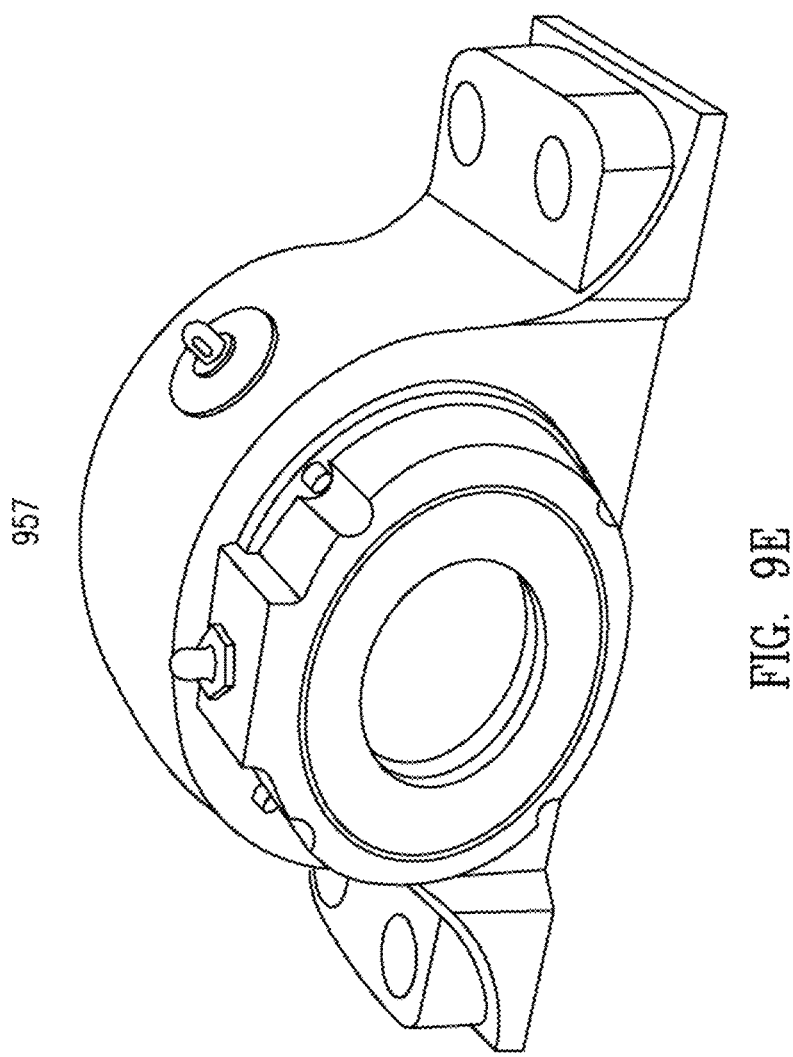
FIG. 9E shows one specific illustrative example of a block bearing that can be used with one embodiment of the disclosed methods and systems.

FIG. 9E shows one specific illustrative example of a block bearing 957 that can be used with one embodiment of the disclosed methods and systems as inner bearings 923.

Figure 9F:
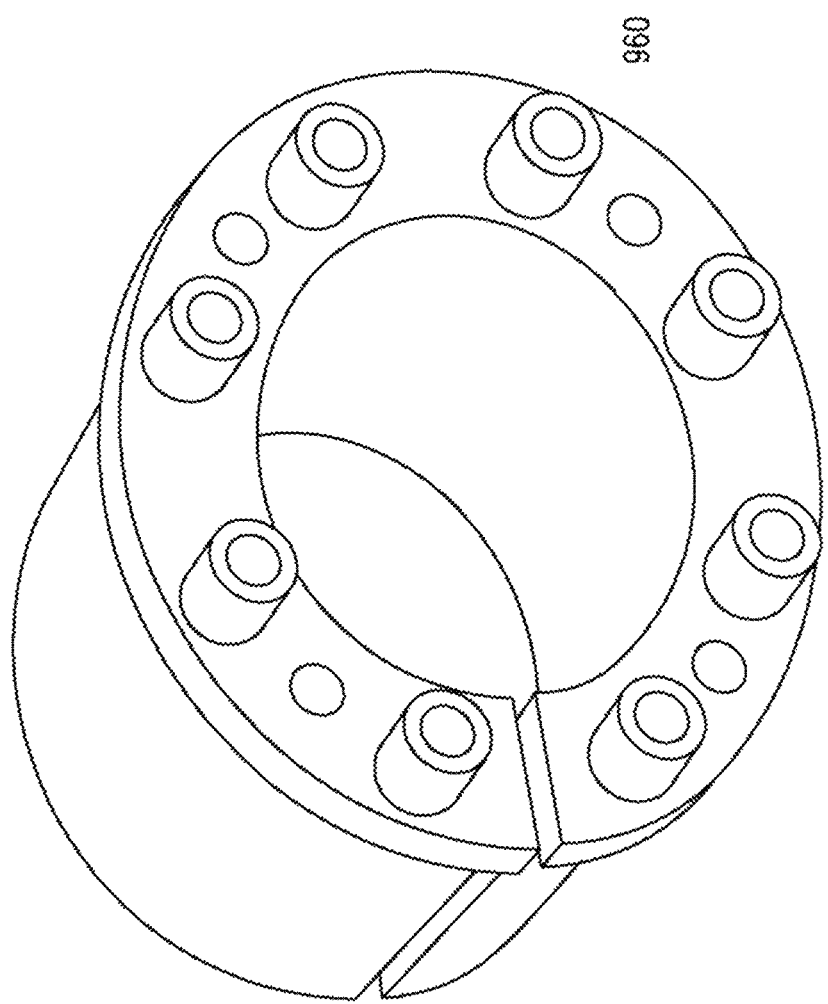
FIG. 9F shows one specific illustrative example of a wheel locking assembly that can be used with one embodiment of the disclosed methods and systems.

FIG. 9F shows one specific illustrative example of a wheel locking assembly 960 that can be used with one embodiment of the disclosed methods and systems adapter couplers 921.

Figure 10:
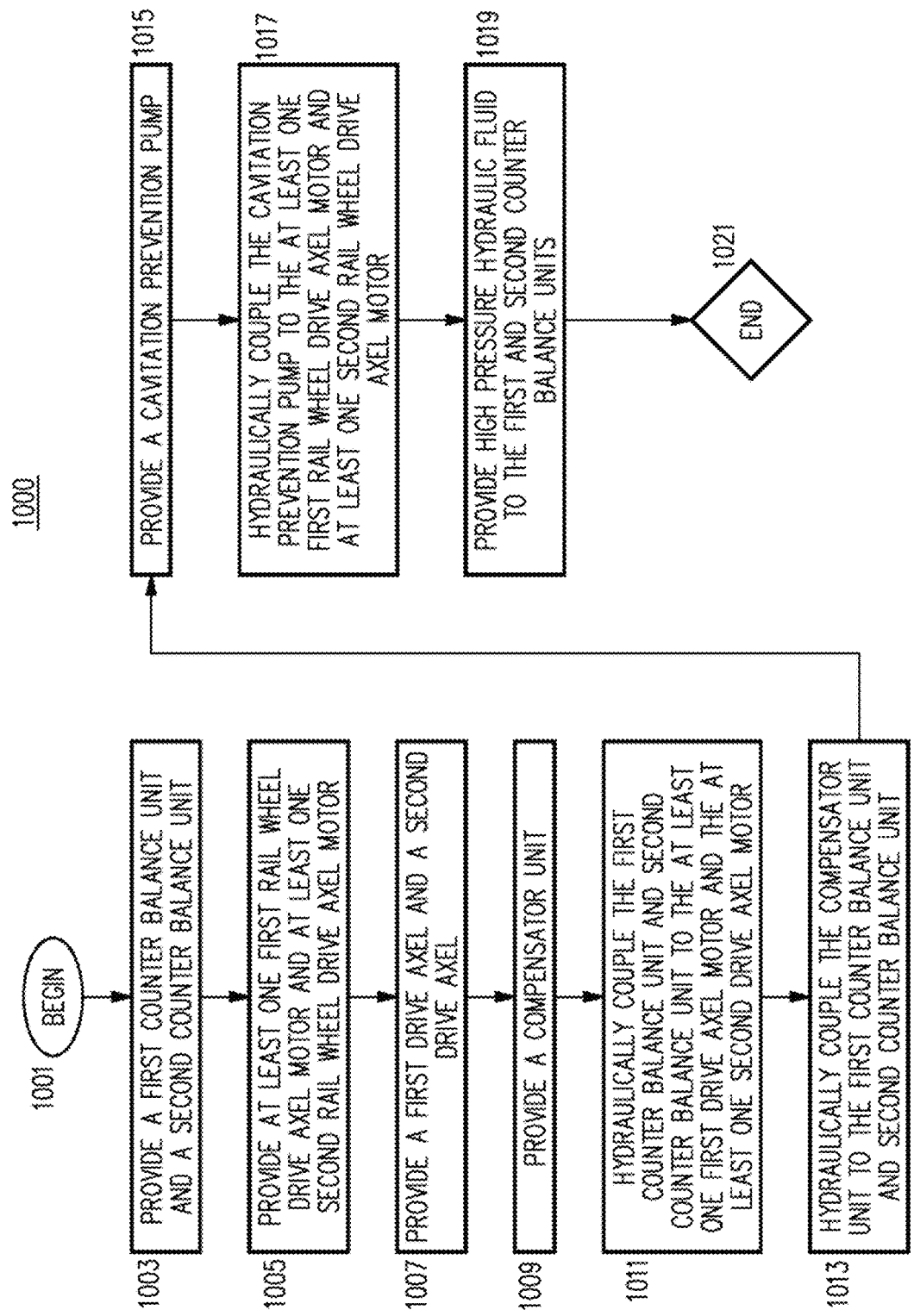
FIG. 10 is a flow chart showing some of the operations of a process for providing and using the disclosed rail wheel drive system for high rail drive systems in accordance with one embodiment.

FIG. 10 is a flow chart showing some of the operations of a process 1000 for providing and utilizing the disclosed high rail drive system in accordance with one embodiment.

Referring to FIGS. 2A, 2C, 3, 9A, and 10 together, as seen in FIG. 10, process 1000 begins at begin operation 1001 and process flow proceeds to operation 1003.

In one embodiment, at operation 1003 a first counterbalance unit and a second counterbalance unit are provided.

In one embodiment, a first counterbalance unit and a second counterbalance unit provided are any first counterbalance unit and a second counterbalance unit discussed above, such as first counterbalance unit 223 and second counterbalance unit 224.

Referring to FIGS. 2A, 2C and 3, in one embodiment, the first and second counterbalance units of operation 1003 are first and second counterbalance units 223/224 that are used to prevent the high pressure back flow issues of prior art systems discussed above. In one embodiment, first and second counterbalance units 223/224 restrict the flow of hydraulic fluid from the rail wheel drive axel motors 225A, 225B, 226A, and 226B along hydraulic fluid lines 237A, 237B, 257A, 257B, 238A, 238B, 258A, and 258B, 235, 255, 236, 256, 231, 251, 232, and 252 back to fluid reservoir 205 when high rail drive system 200 is in the neutral or coasting state.

In one embodiment, when the hydraulic fluid pressure on high pressure hydraulic lines 235, 236, 237A, 237B, 238A, and 238B to the rail wheel drive axel motors 225A, 225B, 226A, and 226B decreases below a threshold level, such as when the rail wheel drive axel motors 225A, 225B, 226A, and 226B are unpowered and on-rail components 291, 293, 292, 294, in this example rail wheels, are coasting, first and second counterbalance units 223/224 sense this drop in pressure and provide dynamic braking in the hydraulic system similar to that of jake brakes in truck exhaust systems.

Consequently, using the disclosed embodiments, the pulling of hydraulic fluid from the hydraulic lines into the rail wheel drive axel motors and simultaneous pushing the hydraulic fluid back into the hydraulic system when the rail wheel drive axel motors are unpowered is minimized. As a result, the buildup of extreme back pressure in the hydraulic system of the disclosed high rail drive system is avoided.

Returning to FIG. 10, in one embodiment, once a first counterbalance unit and a second counterbalance unit are provided at operation 1003, process flow proceeds to operation 1005.

In one embodiment, at operation 1005 at least one first rail wheel drive axel motor and at least one second rail wheel drive axel motor are provided.

In one embodiment, the at least one first rail wheel drive axel motor and at least one second rail wheel drive axel motor provided are any rail wheel drive axel motors discussed herein, such as rail wheel drive axel motors 225A, 225B, 226A, and 226B.

In one embodiment, once at least one first rail wheel drive axel motor and at least one second rail wheel drive axel motor are provided at operation 1005, process flow proceeds to operation 1007.

In one embodiment, at operation 1007 a first drive axel and a second drive axel are provided and operationally coupled to the at least one first rail wheel drive axel motor and at least one second rail wheel drive axel motor, respectively.

In one embodiment, the first drive axel and second drive axel provided at operation 1007 are any of the drive axials discussed herein such as first drive axel 227, second drive axel 228 and/or single shaft through motor rail wheel drive axial 900.

In one embodiment, once a first drive axel and a second drive axel are provided at operation 1007, process flow proceeds to operation 1009.

In one embodiment, at operation 1009, a compensator unit is provided.

In one embodiment, the compensator unit provided at operation 1009 is any compensator unit discussed here, such as compensator unit 222.

Referring to FIGS. 2A, 2C, and 3, as noted above, if the pressure of the high pressure hydraulic fluid provided to first low speed axel drive motor 225A and/or first high-speed axel drive motor 225B used to power second drive axel 227 is significantly higher or lower than the pressure of the high pressure hydraulic fluid provided to second low speed axel drive motor 226A and/or second high-speed axel drive motor 226B used to power second drive axel 228, unbalanced drive forces are exerted on first drive axel 227 and second drive axel 228. As a result, first drive axel on-rail components 291/293 and second drive axel on-rail components 292/294 are either dragging or pushing with respect to each other.

To prevent this from occurring, the disclosed high rail drive system 200 includes compensator unit 222. In one embodiment, compensator unit 222 is a limited slip valve compensator unit.

As seen in FIG. 2C, in one embodiment, compensator unit 222 is implemented between high pressure hydraulic fluid line 235 and return hydraulic fluid line 255 that connect first diverter unit 213 and first counterbalance unit 223 and high pressure hydraulic fluid line 236 and return hydraulic fluid line 256 that connect second diverter unit 214 and second counterbalance unit 224.

As also seen in FIG. 2C, in one embodiment, high pressure hydraulic fluid line 235 is hydraulically coupled to compensator unit 222 by way of equalization hydraulic line 273 and return hydraulic fluid line 255 is hydraulically coupled to compensator unit 222 by way of equalization hydraulic line 271.

Similarly, in one embodiment, high pressure hydraulic fluid line 236 is hydraulically coupled to compensator unit 222 by way of equalization hydraulic line 274 and return hydraulic fluid line 255 is hydraulically coupled to compensator unit 222 by way of equalization hydraulic line 272.

In one embodiment, compensator unit 222 uses limited slip valves to mechanically compare hydraulic pressure in high pressure hydraulic fluid line 235 and high pressure hydraulic fluid line 236. Similarly, in one embodiment, compensator unit 222 uses limited slip valves to mechanically compare hydraulic pressure in return hydraulic fluid line 255 and return hydraulic fluid line 256.

In one embodiment, when a threshold differential is detected between the hydraulic pressure in high pressure hydraulic fluid line 235 and high pressure hydraulic fluid line 236 and/or return hydraulic fluid line 255 and return hydraulic fluid line 256, compensator unit 222 allows hydraulic fluid pressure on these hydraulic fluid lines to be equalized by allowing hydraulic fluid to flow from the hydraulic lines of one wheel drive axel motor to the hydraulic lines of the another wheel drive axel motor until the hydraulic pressure on the hydraulic lines of the wheel drive axel motors is equalized to below threshold differential value.

In this way, compensator unit 222 provides for true four wheel drive by ensuring balanced hydraulic pressure on the high pressure hydraulic fluid line 235 and high pressure hydraulic fluid line 236 of the wheel drive axel motors 225A/225B and 226A/226B. This, in turn, provides for relatively equal drive forces on the first drive axel on-rail components 291/293 and second drive axel on-rail components 292/294.

As a result, the on-rail components 291/293 and 292/294, in this example rail wheels, are neither dragging nor pushing with respect to each other. This minimizes the inefficiency and uneven wear and tear on the rail wheel drive axel motors 225A/225B and 226A/226B, rail wheel axels 227/228, and the on-rail components 291/293 and 292/294, e.g., rail wheels, that is associated with unequal hydraulic fluid pressure being provided to rail wheel drive axel motors 225A/225B and 226A/226B.

Returning to FIG. 10, in one embodiment, once a compensator unit is provided at operation 1009, process flow proceeds to operation 1011.

In one embodiment, at operation 1011 the first counterbalance unit and second counterbalance unit of operation 1003 are hydraulically coupled to the at least one first rail wheel drive axel motor and at least one second rail wheel drive axel motor of operation 1005.

In one embodiment, at operation 1011 the first counterbalance unit of operation 1003 is hydraulically coupled to the at least one first rail wheel drive axel motor of operation 1005 using high pressure hydraulic fluid lines such as high pressure hydraulic fluid lines 237A and 237B and return hydraulic fluid lines such as return hydraulic fluid lines 257A and 257B.

In one embodiment, at operation 1011 the second counterbalance unit of operation 1003 is hydraulically coupled to the at least one second rail wheel drive axel motor of operation 1005 using high pressure hydraulic fluid lines such as high pressure hydraulic fluid lines 238A and 238B and return hydraulic fluid lines such as return hydraulic fluid lines 258A and 258B.

In one embodiment, once the first counterbalance unit and second counterbalance unit are hydraulically coupled to the at least one first rail wheel drive axel motor and at least one second rail wheel drive axel motor at operation 1011, process flow proceeds to operation 1013.

In one embodiment, at operation 1013, the compensator unit of operation 1009 is hydraulically coupled to the first counterbalance unit and the second counterbalance unit of operation 1003.

Referring to FIGS. 2A, 2C, 3, and 9A, in one embodiment, the compensator unit of operation 1009 is hydraulically coupled to the first counterbalance unit using high pressure hydraulic fluid lines such as high pressure hydraulic fluid line 235 and return hydraulic fluid lines such as return hydraulic fluid line 255 and equalization hydraulic lines such as equalization hydraulic lines 271 and 273.

In one embodiment, the compensator unit of operation 1009 is hydraulically coupled to the second counterbalance unit using high pressure hydraulic fluid lines such as high pressure hydraulic fluid line 236 and return hydraulic fluid lines such as return hydraulic fluid line 256 and equalization hydraulic lines such as equalization hydraulic lines 272 and 274.

Therefore, at operation 1013, the compensator unit of operation 1009 is hydraulically coupled between the first counterbalance unit and the second counterbalance unit of operation 1003.

In one embodiment, once the compensator unit of operation 1009 is hydraulically coupled to the first counterbalance unit and the second counterbalance unit at operation 1013, process flow proceeds to operation 1015.

In one embodiment, at operation 1015 a cavitation prevention pump is provided.

In one embodiment, the cavitation prevention pump provided at operation 1015 is any cavitation prevention pump discussed herein such as cavitation prevention pump 203 and cavitation prevention pump 400 (FIG. 4).

Returning to FIG. 10, once a cavitation prevention pump is provided at operation 1015, process flow proceeds to operation 1017.

In one embodiment, at operation 1017, the cavitation prevention pump of operation 1015 is hydraulically coupled to the at least one first rail wheel drive axel motor and at least one second rail wheel drive axel motor of operation 1005.

Referring to FIGS. 2A, 2C, 3, and 9A, in one embodiment, at operation 1017, the cavitation prevention pump of operation 1015 is hydraulically coupled to the at least one first rail wheel drive axel motor of operation 1005 using supplemental hydraulic fluid lines such as supplemental hydraulic fluid line 261 or supplemental hydraulic fluid line 361 discussed herein.

In one embodiment, at operation 1017, the cavitation prevention pump of operation 1015 is hydraulically coupled to the at least one second rail wheel drive axel motor of operation 1005 using supplemental hydraulic fluid lines such as supplemental hydraulic fluid line 262 or supplemental hydraulic fluid line 362 discussed herein.

In one embodiment, in the unpowered/coasting state, cavitation prevention pump 203 provides supplementary hydraulic fluid to first low speed axel drive motor 225A, via supplemental hydraulic fluid line 261, first high-speed axel drive motor 225B, via supplemental hydraulic fluid line 263, second low speed axel drive motor 226A, via supplemental hydraulic fluid line 262, and second high-speed axel drive motor 226B, via supplemental hydraulic fluid line 264.

In this way, when the rail wheel drive axel motors 225A, 225B, 226A, and 226B are unpowered and on-rail components 291, 293, 292, 294, are coasting, or the hydraulic pressure to the rail wheel drive axel motors 225A, 225B, 226A, and 226B decreases for any reason, a constant small supply of hydraulic fluid is still provided to the rail wheel drive axel motors 225A, 225B, 226A, and 226B.

By providing this constant small supply of hydraulic fluid to the rail wheel drive axel motors 225A, 225B, 226A, and 226B, even when they are unpowered, enough hydraulic fluid is provided to prevent cavitation and the prevent the stress and damage to rail wheel drive axel motors 225A, 225B, 226A, and 226B that is associated with cavitation.

Returning to FIG. 10, in one embodiment, once the cavitation prevention pump of operation 1015 is hydraulically coupled to the at least one first rail wheel drive axel motor and at least one second rail wheel drive axel motor at operation 1017, process flow proceeds to operation 1019.

In one embodiment, at operation 1019, high pressure hydraulic fluid is provided to the first counterbalance unit of operation 1003 and the second counterbalance unit of operation 1003.

Referring to FIGS. 2A, 2C, 3, and 9A, in one embodiment, at operation 1019, high pressure hydraulic fluid is provided to the first counterbalance unit of operation 1003 using a fluid reservoir, such as fluid reservoir 203, one or more hydraulic fluid pumps, such as main hydraulic fluid pump 302, and high pressure hydraulic fluid lines, such as high pressure hydraulic fluid lines 231 and 235.

In one embodiment, at operation 1019, high pressure hydraulic fluid is provided to the second counterbalance unit of operation 1003 using a fluid reservoir, such as fluid reservoir 203, one or more hydraulic fluid pumps, such as main hydraulic fluid pump 302, and high pressure hydraulic fluid lines, such as high pressure hydraulic fluid lines 232 and 236.

In one embodiment, once high pressure hydraulic fluid is provided to the first counterbalance unit of operation 1003 and the second counterbalance unit of operation 1003 at operation 1019, process flow proceeds to operation end operation 1021.

In one embodiment, at operation end 1021, process 1000 ends.

As discussed above, the disclosed methods and systems provide an improved high rail drive system that minimizes or eliminates back pressure issues, cavitation issues, uneven drive issues, and rail axel drive motor complexity issues that are inherent in the prior art systems. As a result, the disclosed methods and systems provide improved high rail drive systems that are reliable, cost effective, and efficient, and relatively light weight with fewer moving and electronics.

Consequently, the disclosed methods and systems provide a technical solution to the is the long-standing technical problem of providing high rail drive systems that do not suffer from the prior art back pressure issues, cavitation issues, uneven drive issues, complexity, and rail axel drive motor issues.

It should be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

Herein, an improved hydraulic drive system is disclosed. One embodiment of the disclosed hydraulic drive system includes a fluid reservoir for providing and receiving hydraulic fluid.

One embodiment of the disclosed hydraulic drive system includes at least one hydraulic fluid pump for providing high pressure hydraulic fluid, the at least one hydraulic fluid pump being operatively coupled to the fluid reservoir.

One embodiment of the disclosed hydraulic drive system includes a first drive axel.

One embodiment of the disclosed hydraulic drive system includes at least one first axel drive motor, the at least one first axel drive motor being operatively coupled to the first drive axel such that when high pressure hydraulic fluid enters the at least one first axel drive motor, the hydraulic fluid passes through the at least one first axel drive motor to power the first drive axel, the hydraulic fluid then exiting the at least one first axel drive motor as low pressure hydraulic fluid.

One embodiment of the disclosed hydraulic drive system includes a second drive axel.

One embodiment of the disclosed hydraulic drive system includes at least one second axel drive motor, the at least one second axel drive motor being operatively coupled to the second drive axel such that when high pressure hydraulic fluid enters the at least one second axel drive motor, the hydraulic fluid passes through the at least one second axel drive motor to power the second drive axel, the hydraulic fluid then exiting the at least one second axel drive motor as low pressure hydraulic fluid.

One embodiment of the disclosed hydraulic drive system includes a first counterbalance unit, the first counterbalance unit receiving high pressure hydraulic fluid from the at least one hydraulic fluid pump.

In accordance with one embodiment of the disclosed hydraulic drive system, the first counterbalance unit being hydraulically coupled to the at least one first axel drive motor to provide the high pressure hydraulic fluid to the at least one first axel drive motor.

In accordance with one embodiment of the disclosed hydraulic drive system, the first counterbalance unit is hydraulically coupled to the at least one first axel drive motor so that the low pressure hydraulic fluid exiting the at least one first axel drive motor is passed through the first counterbalance unit to the fluid reservoir wherein.

In accordance with one embodiment of the disclosed hydraulic drive system, the first counterbalance unit when high pressure hydraulic fluid is not being supplied to the at least one first axel drive motor, the first counterbalance unit restricts the flow of hydraulic fluid exiting the at least one first axel drive motor back to the fluid reservoir to provide dynamic braking to the at least one first axel drive motor when the at least one first axel drive motor is in an unpowered state;

One embodiment of the disclosed hydraulic drive system includes a second counterbalance unit, the second counterbalance unit receiving high pressure hydraulic fluid from the at least one hydraulic fluid pump.

In accordance with one embodiment of the disclosed hydraulic drive system, the second counterbalance unit is hydraulically coupled to the at least one second axel drive motor to provide the high pressure hydraulic fluid to the at least one second axel drive motor.

In accordance with one embodiment of the disclosed hydraulic drive system, the second counterbalance unit is hydraulically coupled to the at least one second axel drive motor such that the low pressure hydraulic fluid exiting the at least one second axel drive motor is passed through the second counterbalance unit to the fluid reservoir.

In accordance with one embodiment of the disclosed hydraulic drive system, when high pressure hydraulic fluid is not being supplied to the at least one second axel drive motor, the second counterbalance unit restricts the flow of hydraulic fluid exiting the at least one second axel drive motor back to the fluid reservoir to provide dynamic braking to the at least one second axel drive motor when the at least one second axel drive motor is in an unpowered state.

One embodiment of the disclosed hydraulic drive system includes a compensator unit.

In accordance with one embodiment of the disclosed hydraulic drive system, the compensator unit is hydraulically coupled to both the high pressure hydraulic fluid and the low pressure hydraulic fluid of the at least one first axel drive motor and the high pressure hydraulic fluid and the low pressure hydraulic fluid of the at least one second axel drive motor such that the compensator unit allows high pressure hydraulic fluid and low pressure hydraulic fluid to pass between the at least one first axel drive motor and the at least one second axel drive motor so that the pressure of the high pressure hydraulic fluid pressure and the pressure of the low pressure hydraulic fluid can be equalized between the at least one first axel drive motor and the at least one second axel drive motor.

One embodiment of the disclosed hydraulic drive system includes a cavitation prevention pump.

In accordance with one embodiment of the disclosed hydraulic drive system, the cavitation prevention pump is operatively coupled to fluid reservoir.

In accordance with one embodiment of the disclosed hydraulic drive system, the cavitation prevention pump is operatively coupled to the at least one first axel drive motor such that the cavitation prevention pump provides hydraulic fluid to the at least one first axel drive motor to prevent the at least one first axel drive motor from cavitating when no high pressure hydraulic fluid is provided to the at least one first axel drive motor.

In accordance with one embodiment of the disclosed hydraulic drive system, the cavitation prevention pump is operatively coupled to the at least one second axel drive motor such that the cavitation prevention pump provides hydraulic fluid to the at least one second axel drive motor to prevent the at least one second axel drive motor from cavitating when no high pressure hydraulic fluid is provided to the at least one second axel drive motor.

In accordance with one embodiment of the disclosed hydraulic drive system, at least one first drive axel on-rail component is operative coupled to the first drive axel and at least one second drive axel on-rail component is operatively coupled to the second drive axel.

In accordance with one embodiment of the disclosed hydraulic drive system, the at least one first drive axel on-rail component and the at least one second drive axel on-rail component are rail wheels.

In accordance with one embodiment of the disclosed hydraulic drive system, at least one of the first axel drive motor and the first drive axel and the second axel drive motor and the second drive axel are configured as single shaft through motor rail wheel drive axials.

In accordance with one embodiment of the disclosed hydraulic drive system, at least one of the first axel drive motor of the at least one single shaft through motor rail wheel drive axial further is a two-speed four port motor, the two-speed four port motor including a low speed motor and a high-speed motor housed in a single two-speed four port motor housing and a low-to-high-speed/high-to-low two speed shifting unit.

In accordance with one embodiment of the disclosed hydraulic drive system, the compensator unit is a limited slip valve compensator unit.

In the discussion above, certain aspects of one embodiment include process steps and/or operations described herein for illustrative purposes in a particular order and/or grouping. However, the particular order and/or grouping shown and discussed herein are illustrative only and not limiting. Those of skill in the art will recognize that other orders and/or grouping of the process steps and/or operations are possible and, in some embodiments, one or more of the process steps and/or operations discussed above can be combined and/or deleted. In addition, sections of one or more of the process steps and/or operations can be re-grouped as sections of one or more other of the process steps and/or operations discussed herein. Consequently, the particular order and/or grouping of the process steps and/or operations discussed herein do not limit the scope of the invention as claimed below.

In addition, the features shown in the figures are identified using a particular nomenclature for ease of description and understanding, but other nomenclature is often used in the art to identify equivalent features.

Therefore, numerous variations, whether explicitly provided for by the specification or implied by the specification or not, may be implemented by one of skill in the art in view of this disclosure.

What is claimed is:

1. A hydraulic drive system comprising:
   a fluid reservoir for providing and receiving hydraulic fluid;
   at least one hydraulic fluid pump for providing high pressure hydraulic fluid, the at least one hydraulic fluid pump being operatively coupled to the fluid reservoir;
   a first drive axel;
   at least one first axel drive motor, the at least one first axel drive motor being operatively coupled to the first drive axel such that when high pressure hydraulic fluid enters the at least one first axel drive motor, the hydraulic fluid passes through the at least one first axel drive motor to power the first drive axel, the hydraulic fluid then exiting the at least one first axel drive motor as low pressure hydraulic fluid;
   a second drive axel;
   at least one second axel drive motor, the at least one second axel drive motor being operatively coupled to the second drive axel such that when high pressure hydraulic fluid enters the at least one second axel drive motor, the hydraulic fluid passes through the at least one second axel drive motor to power the second drive axel, the hydraulic fluid then exiting the at least one second axel drive motor as low pressure hydraulic fluid;
   a first counterbalance unit, the first counterbalance unit receiving high pressure hydraulic fluid from the at least one hydraulic fluid pump, the first counterbalance unit being hydraulically coupled to the at least one first axel drive motor to provide the high pressure hydraulic fluid to the at least one first axel drive motor, the first counterbalance unit being hydraulically coupled to the at least one first axel drive motor such that the low pressure hydraulic fluid exiting the at least one first axel drive motor is passed through the first counterbalance unit to the fluid reservoir wherein,
      when high pressure hydraulic fluid is not being supplied to the at least one first axel drive motor, the first counterbalance unit restricts the flow of hydraulic fluid exiting the at least one first axel drive motor back to the fluid reservoir to provide dynamic braking to the at least one first axel drive motor when the at least one first axel drive motor is in an unpowered state;
   a second counterbalance unit, the second counterbalance unit receiving high pressure hydraulic fluid from the at least one hydraulic fluid pump, the second counterbalance unit being hydraulically coupled to the at least one second axel drive motor to provide the high pressure hydraulic fluid to the at least one second axel drive motor, the second counterbalance unit being hydraulically coupled to the at least one second axel drive motor such that the low pressure hydraulic fluid exiting the at least one second axel drive motor is passed through the second counterbalance unit to the fluid reservoir wherein,
      when high pressure hydraulic fluid is not being supplied to the at least one second axel drive motor, the second counterbalance unit restricts the flow of hydraulic fluid exiting the at least one second axel drive motor back to the fluid reservoir to provide dynamic braking to the at least one second axel drive motor when the at least one second axel drive motor is in an unpowered state;
   a compensator unit, the compensator unit being hydraulically coupled to both the high pressure hydraulic fluid and the low pressure hydraulic fluid of the at least one first axel drive motor and the high pressure hydraulic fluid and the low pressure hydraulic fluid of the at least one second axel drive motor such that the compensator unit allows high pressure hydraulic fluid and low pressure hydraulic fluid to pass between the at least one first axel drive motor and the at least one second axel drive motor so that the pressure of the high pressure hydraulic fluid pressure and the pressure of the low pressure hydraulic fluid can be equalized between the at least one first axel drive motor and the at least one second axel drive motor; and
   a cavitation prevention pump, the cavitation prevention pump being operatively coupled to fluid reservoir, the cavitation prevention pump being operatively coupled to the at least one first axel drive motor such that the cavitation prevention pump provides hydraulic fluid to the at least one first axel drive motor to prevent the at least one first axel drive motor from cavitating when no high pressure hydraulic fluid is provided to the at least one first axel drive motor, the cavitation prevention pump being operatively coupled to the at least one second axel drive motor such that the cavitation prevention pump provides hydraulic fluid to the at least one second axel drive motor to prevent the at least one second axel drive motor from cavitating when no high pressure hydraulic fluid is provided to the at least one second axel drive motor.

2. The hydraulic drive system of claim 1 further comprising;
   at least one first drive axel on-rail component, the at least one first drive axel on-rail component being operatively coupled to the first drive axel; and
   at least one second drive axel on-rail component, the at least one second drive axel on-rail component being operatively coupled to the second drive axel.

3. The hydraulic drive system of claim 2 wherein at least one first drive axel on-rail component and the at least one second drive axel on-rail component are rail wheels.

4. The hydraulic drive system of claim 3 wherein at least one of the first axel drive motor and the first drive axel and the second axel drive motor and the second drive axel are configured as single shaft through motor rail wheel drive axials.

5. The hydraulic drive system of claim 4 further wherein at least one of the first axel drive motor of the at least one single shaft through motor rail wheel drive axial further is a two-speed four port motor, the two-speed four port motor including a low speed motor and a high-speed motor housed in a single two-speed four port motor housing and a low-to-high-speed/high-to-low two speed shifting unit.

6. The hydraulic drive system of claim 1 wherein the compensator unit is a limited slip valve compensator unit.

7. A high-rail wheel drive system comprising:
at least one diverter, the at least one diverter having an off-rail drive operation position and an on-rail drive operating position;
a hydraulic supply sub-system, the hydraulic supply sub-system including at least one fluid reservoir for providing and receiving hydraulic fluid, at least one hydraulic fluid pump for providing high pressure hydraulic fluid, at least one high pressure hydraulic fluid supply line for providing high pressure hydraulic fluid to the at least one diverter of the high-rail wheel drive system, and at least one low pressure hydraulic fluid return line for returning low pressure fluid from components of high-rail wheel drive system to the fluid reservoir from the at least one diverter;
an off-rail drive sub-system, the off rail sub system being hydraulically coupled to the at least one diverter such that when the at least one diverter is in the off-rail drive operation position, the high pressure hydraulic fluid is provided to one or more off-rail drive component drive motors of the off-rail drive sub-system to power one or more off-rail drive components, the off rail sub system being hydraulically coupled to the at least one diverter such that when the at least one diverter is in the off-rail drive operation position, the low pressure hydraulic from the one or more off-rail drive component drive motors is returned to the fluid reservoir through the at least one diverter; and
a rail wheel drive sub-system, the being hydraulically coupled to the at least one diverter such that when the at least one diverter is in the on-rail drive operation position, the high pressure hydraulic fluid is provided to rail wheel drive sub-system and low pressure hydraulic fluid from the rail wheel drive sub-system is returned to the fluid reservoir through the at least one diverter,
the rail wheel drive sub-system comprising:
a first drive axel;
at least one first axel drive motor, the at least one first axel drive motor being operatively coupled to the first drive axel such that when high pressure hydraulic fluid for the at least one diverter enters the at least one first axel drive motor, the hydraulic fluid passes through the at least one first axel drive motor to power the first drive axel, the hydraulic fluid then exiting the at least one first axel drive motor as low pressure hydraulic fluid;
a second drive axel;
at least one second axel drive motor, the at least one second axel drive motor being operatively coupled to the second drive axel such that when high pressure hydraulic fluid from the at least on diverter enters the at least one second axel drive motor, the hydraulic fluid passes through the at least one second axel drive motor causing the second drive axel to power the second drive axel, the hydraulic fluid then exiting the at least one second axel drive motor as low pressure hydraulic fluid;
a first counterbalance unit, the first counterbalance unit receiving high pressure hydraulic fluid from the at least one diverter, the first counterbalance unit being hydraulically coupled to the at least one first axel drive motor to provide the high pressure hydraulic fluid to the at least one first axel drive motor, the first counterbalance unit being hydraulically coupled to the at least one first axel drive motor such that the low pressure hydraulic fluid exiting the at least one first axel drive motor is passed through the first counterbalance unit to the fluid reservoir wherein,
when high pressure hydraulic fluid is not being supplied to the at least one first axel drive motor, the first counterbalance unit restricts the flow of hydraulic fluid exiting the at least one first axel drive motor back to the fluid reservoir to provide dynamic braking to the at least one first axel drive motor when the at least one first axel drive motor is in an unpowered state;
a second counterbalance unit, the second counterbalance unit receiving high pressure hydraulic fluid from the at least one diverter, the second counterbalance unit being hydraulically coupled to the at least one second axel drive motor to provide the high pressure hydraulic fluid to the at least one second axel drive motor, the second counterbalance unit being hydraulically coupled to the at least one second axel drive motor such that the low pressure hydraulic fluid exiting the at least one second axel drive motor is passed through the second counterbalance unit to the fluid reservoir wherein,
when high pressure hydraulic fluid is not being supplied to the at least one second axel drive motor, the second counterbalance unit restricts the flow of hydraulic fluid exiting the at least one second axel drive motor back to the fluid reservoir to provide dynamic braking to the at least one second axel drive motor when the at least one second axel drive motor is in an unpowered state;
a compensator unit, the compensator unit being hydraulically coupled to both the high pressure hydraulic fluid and the low pressure hydraulic fluid of the at least one first axel drive motor and the high pressure hydraulic fluid and the low pressure hydraulic fluid of the at least one second axel drive motor such that the compensator unit allows high pressure hydraulic fluid and low pressure hydraulic fluid to pass between the at least one first axel drive motor and the at least one second axel drive motor so that the pressure of the high pressure hydraulic fluid pressure and the pressure of the low pressure hydraulic fluid can be equalized between the at least one first axel drive motor and the at least one second axel drive motor; and
a cavitation prevention pump, the cavitation prevention pump being operatively coupled to fluid reservoir, the cavitation prevention pump being operatively coupled to the at least one first axel drive motor such that the cavitation prevention pump provides hydraulic fluid to the at least one first axel drive motor to prevent the at least one first axel drive motor from cavitating when no high pressure hydraulic fluid is provided to the at least one first axel drive motor, the cavitation prevention pump being operatively coupled to the at least one second axel drive motor such that the cavitation prevention pump provides hydraulic fluid to the at least one second axel drive motor to prevent the at least one second axel drive motor from cavitating when no high pressure hydraulic fluid is provided to the at least one second axel drive motor.

8. The high-rail wheel drive system of claim 7 further comprising:
a piece of heavy equipment, the piece of heavy equipment being operatively coupled to the high-rail wheel drive system such that the high-rail wheel drive system is used to propel the piece of heavy equipment.

9. The high-rail wheel drive system of claim 8 wherein at least part of the hydraulic supply sub-system and the off-rail drive sub-system are components of the piece of heavy equipment.

10. The high-rail wheel drive system of claim 9 wherein the piece of heavy equipment is selected from the group of heavy equipment including:
an excavator;
a bull dozer;
a crane;
a back hoe; and
a forklift.

11. The high-rail wheel drive system of claim 7 further comprising;
at least one first drive axel on-rail component, the at least one first drive axel on-rail component being operatively coupled to the first drive axel; and
at least one second drive axel on-rail component, the at least one second drive axel on-rail component being operatively coupled to the second drive axel.

12. The high-rail wheel drive system of claim 11 wherein at least one first drive axel on-rail component and the at least one second drive axel on-rail component are rail wheels.

13. The high-rail wheel drive system of claim 12 wherein at least one of the first axel drive motor and the first drive axel and the second axel drive motor and the second drive axel are configured as single shaft through motor rail wheel drive axials.

14. The high-rail wheel drive system of claim 13 further wherein at least one of the first axel drive motor of the at least one single shaft through motor rail wheel drive axial further is a two-speed four port motor, the two-speed four port motor including a low speed motor and a high-speed motor housed in a single two-speed four port motor housing and a low-to-high-speed/high-to-low two speed shifting unit.

15. The high-rail wheel drive system of claim 7 wherein the compensator unit is a limited slip valve compensator unit.

16. The high-rail wheel drive system of claim 7 wherein at least one of the one or more off-rail drive components is a cat track.

17. A method comprising:
providing a first rail wheel drive axel;
providing at least one first rail wheel drive axel motor;
operatively coupling the at least one first rail wheel drive axel motor to the first rail wheel drive axel such that when high pressure hydraulic fluid is to the provided first rail wheel drive axel motor, the first rail wheel drive axel motor powers the first rail wheel drive axel;
providing a first counterbalance unit;
hydraulically coupling the first counterbalance unit to the at least one first rail wheel drive axel motor such that when high pressure hydraulic fluid is provided to the first counterbalance unit, the first counterbalance unit provides the high pressure hydraulic fluid to the at least one first rail wheel drive axel motor, thereby powering the at least one first rail wheel drive axel motor, and such that low pressure hydraulic fluid from the at least one first rail wheel drive axel motor is provided back to the first counterbalance unit wherein,
when high pressure hydraulic fluid is not being supplied to the at least one first rail wheel drive axel motor, the first counterbalance unit restricts the flow of hydraulic fluid exiting the at least one first axel drive motor back to the fluid reservoir to provide dynamic braking to the at least one first axel drive motor when the at least one first axel drive motor is in an unpowered state;
providing a second rail wheel drive axel;
providing at least one second rail wheel drive axel motor;
operatively coupling the at least one second rail wheel drive axel motor to the second rail wheel drive axel such that when high pressure hydraulic fluid is to the provided second rail wheel drive axel motor, the second rail wheel drive axel motor powers the second rail wheel drive axel;
providing a second counterbalance unit;
hydraulically coupling the second counterbalance unit to the at least one second rail wheel drive axel motor such that when high pressure hydraulic fluid is provided to the second counterbalance unit, the second counterbalance unit provides the high pressure hydraulic fluid to the at least one second rail wheel drive axel motor, thereby powering the at least one second rail wheel drive axel motor, and such that low pressure hydraulic fluid from the at least one second rail wheel drive axel motor is provided back to the second counterbalance unit wherein,
when high pressure hydraulic fluid is not being supplied to the at least one second rail wheel drive axel motor, the second counterbalance unit restricts the flow of hydraulic fluid exiting the at least one second axel drive motor back to the fluid reservoir to provide dynamic braking to the at least one second axel drive motor when the at least one second axel drive motor is in an unpowered state;
providing a compensator unit;
hydraulically coupling the compensator unit to the first counterbalance unit and to the second counterbalance unit such that the compensator unit allows high pressure hydraulic fluid and low pressure hydraulic fluid to pass between the at least one first axel drive motor and the at least one second axel drive motor so that the pressure of the high pressure hydraulic fluid pressure and the pressure of the low pressure hydraulic fluid can be equalized between the at least one first axel drive motor and the at least one second axel drive motor;
providing a cavitation prevention pump;
hydraulically coupling the cavitation prevention pump to the at least one first rail wheel drive axel motor such that the cavitation prevention pump provides hydraulic fluid to the at least one first axel drive motor to prevent the at least one first axel drive motor from cavitating when no high pressure hydraulic fluid is provided to the at least one first axel drive motor;
hydraulically coupling the cavitation prevention pump to the at least one second rail wheel drive axel motor such that the cavitation prevention pump provides hydraulic fluid to the at least one second axel drive motor to prevent the at least one second axel drive motor from cavitating when no high pressure hydraulic fluid is provided to the at least one second axel drive motor; and providing high pressure hydraulic fluid to the first counterbalance unit and the second counterbalance unit.

18. The method of claim 17 further comprising;
providing at least one first drive axel on-rail component, the at least one first drive axel on-rail component being operatively coupled to the first drive axel; and
providing at least one second drive axel on-rail component, the at least one second drive axel on-rail component being operatively coupled to the second drive axel.

19. The method of claim 18 wherein at least one first drive axel on-rail component and the at least one second drive axel on-rail component are rail wheels.

20. The method of claim 19 wherein at least one of the first axel drive motor and the first drive axel and the second axel drive motor and the second drive axel are configured as single shaft through motor rail wheel drive axials.

21. The method of claim 20 further wherein at least one of the first axel drive motor of the at least one single shaft through motor rail wheel drive axial further is a two-speed four port motor, the two-speed four port motor including a low speed motor and a high-speed motor housed in a single two-speed four port motor housing and a low-to-high-speed/high-to-low two speed shifting unit.

22. The method of claim 17 wherein the compensator unit is a limited slip valve compensator unit.

23. A method for providing a high-rail wheel drive system comprising:
providing at least one diverter, the at least one diverter including an off-rail drive operation position and an on-rail drive operating position;
providing a hydraulic supply sub-system, the hydraulic supply sub-system including at least one fluid reservoir for providing and receiving hydraulic fluid, at least one hydraulic fluid pump for providing high pressure hydraulic fluid, at least one high pressure hydraulic fluid supply line for providing high pressure hydraulic fluid to the at least one diverter of the high-rail wheel drive system, and at least one low pressure hydraulic fluid return line for returning low pressure fluid from components of high-rail wheel drive system to the fluid reservoir from the at least one diverter;
providing an off-rail drive sub-system, the off rail sub system being hydraulically coupled to the at least one diverter such that when the at least one diverter is in the off-rail drive operation position, the high pressure hydraulic fluid is provided to one or more off-rail drive component drive motors of the off-rail drive sub-system to power one or more off-rail drive components, the off rail sub system being hydraulically coupled to the at least one diverter such that when the at least one diverter is in the off-rail drive operation position, the low pressure hydraulic from the one or more off-rail drive component drive motors is returned to the fluid reservoir through the at least one diverter; and
providing an on-rail wheel drive sub-system, the on-rail wheel drive sub-system being hydraulically coupled to the at least one diverter such that when the at least one diverter is in the on-rail drive operation position, the high pressure hydraulic fluid is provided to the on-rail wheel drive sub-system and low pressure hydraulic fluid from the rail wheel drive sub-system is returned to the fluid reservoir through the at least one diverter the on-rail wheel drive sub-system including:
a first drive axel;
at least one first axel drive motor, the at least one first axel drive motor being operatively coupled to the first drive axel such that when high pressure hydraulic fluid for the at least one diverter enters the at least one first axel drive motor, the hydraulic fluid passes through the at least one first axel drive motor to power the first drive axel, the hydraulic fluid then exiting the at least one first axel drive motor as low pressure hydraulic fluid;
a second drive axel;
at least one second axel drive motor, the at least one second axel drive motor being operatively coupled to the second drive axel such that when high pressure hydraulic fluid from the at least one diverter enters the at least one second axel drive motor, the hydraulic fluid passes through the at least one second axel drive motor causing the second drive axel to power the second drive axel, the hydraulic fluid then exiting the at least one second axel drive motor as low pressure hydraulic fluid;
a first counterbalance unit, the first counterbalance unit receiving high pressure hydraulic fluid from the at least one diverter, the first counterbalance unit being hydraulically coupled to the at least one first axel drive motor to provide the high pressure hydraulic fluid to the at least one first axel drive motor, the first counterbalance unit being hydraulically coupled to the at least one first axel drive motor such that the low pressure hydraulic fluid exiting the at least one first axel drive motor is passed through the first counterbalance unit to the fluid reservoir wherein,
when high pressure hydraulic fluid is not being supplied to the at least one first axel drive motor, the first counterbalance unit restricts the flow of hydraulic fluid exiting the at least one first axel drive motor back to the fluid reservoir to provide dynamic braking to the at least one first axel drive motor when the at least one first axel drive motor is in an unpowered state;
a second counterbalance unit, the second counterbalance unit receiving high pressure hydraulic fluid from the at least one diverter, the second counterbalance unit being hydraulically coupled to the at least one second axel drive motor to provide the high pressure hydraulic fluid to the at least one second axel drive motor, the second counterbalance unit being hydraulically coupled to the at least one second axel drive motor such that the low pressure hydraulic fluid exiting the at least one second axel drive motor is passed through the second counterbalance unit to the fluid reservoir wherein,
when high pressure hydraulic fluid is not being supplied to the at least one second axel drive motor, the second counterbalance unit restricts the flow of hydraulic fluid exiting the at least one second axel drive motor back to the fluid reservoir to provide dynamic braking to the at least one second axel drive motor when the at least one second axel drive motor is in an unpowered state;
a compensator unit, the compensator unit being hydraulically coupled to both the high pressure hydraulic fluid and the low pressure hydraulic fluid of the at least one first axel drive motor and the high pressure hydraulic fluid and the low pressure hydraulic fluid of the at least one second axel drive motor such that the compensator unit allows high pressure hydraulic fluid and low pressure hydraulic fluid to pass between the at least one first axel drive motor and the at least one second axel drive motor so that the pressure of the high pressure hydraulic fluid pressure and the pressure of the low pressure hydraulic fluid can be equalized between the at least one first axel drive motor and the at least one second axel drive motor; and a cavitation prevention pump, the cavitation prevention pump being operatively coupled to fluid reservoir, the cavitation prevention pump being operatively coupled to the at least one first axel drive motor such that the cavitation prevention pump provides hydraulic fluid to the at least one first axel drive motor to prevent the at least one first axel drive motor from cavitating when no high pressure hydraulic fluid is provided to the at least one first axel drive motor, the cavitation prevention pump being operatively coupled to the at least one second axel drive motor such that the cavitation prevention pump provides hydraulic fluid to the at least one second axel drive motor to prevent the at least one second axel drive motor from cavitating when no high pressure hydraulic fluid is provided to the at least one second axel drive motor.

24. The method for providing a high-rail wheel drive system of claim 23 further comprising:
providing a piece of heavy equipment, the piece of heavy equipment being operatively coupled to the high-rail wheel drive system such that the high-rail wheel drive system is used to propel the piece of heavy equipment.

25. The method for providing a high-rail wheel drive system of claim 24 wherein at least part of the hydraulic supply sub-system and the off-rail drive sub-system are components of the piece of heavy equipment.

26. The method for providing a high-rail wheel drive system of claim 25 wherein the piece of heavy equipment is selected from the group of heavy equipment including:
an excavator;
a bull dozer;
a crane;
a back hoe; and
a forklift.

27. The method for providing a high-rail wheel drive system of claim 23 further comprising;
providing at least one first drive axel on-rail component, the at least one first drive axel on-rail component being operatively coupled to the first drive axel; and
providing at least one second drive axel on-rail component, the at least one second drive axel on-rail component being operatively coupled to the second drive axel.

28. The method for providing a high-rail wheel drive system of claim 27 wherein at least one first drive axel on-rail component and the at least one second drive axel on-rail component are rail wheels.

29. The method for providing a high-rail wheel drive system of claim 27 wherein at least one of the first axel drive motor and the first drive axel and the second axel drive motor and the second drive axel are configured as single shaft through motor rail wheel drive axials.

30. The method for providing a high-rail wheel drive system of claim 29 further wherein at least one of the first axel drive motor of the at least one single shaft through motor rail wheel drive axial further is a two-speed four port motor, the two-speed four port motor including a low speed motor and a high-speed motor housed in a single two-speed four port motor housing and a low-to-high-speed/high-to-low two speed shifting unit.

31. The method for providing a high-rail wheel drive system of claim 23 wherein the compensator unit is a limited slip valve compensator unit.

32. The method for providing a high-rail wheel drive system of claim 23 wherein at least one of the one or more off-rail drive components is a cat track.

* * * * *